US 012443758B2

(12) United States Patent
Hardy et al.

(10) Patent No.: US 12,443,758 B2
(45) Date of Patent: *Oct. 14, 2025

(54) PLATFORM FOR PROVIDING REMOTE ONLINE NOTARIZATION SERVICE

(71) Applicant: Liveoak Technologies, Inc., San Francisco, CA (US)

(72) Inventors: Alexander Hardy, Austin, TX (US); Allan Keller, Austin, TX (US); Peter Rung, Austin, TX (US)

(73) Assignee: Liveoak Technologies, Inc., San Francisco, CA (US)

( * ) Notice: Subject to any disclaimer, the term of this patent is extended or adjusted under 35 U.S.C. 154(b) by 287 days.

This patent is subject to a terminal disclaimer.

(21) Appl. No.: 18/328,243

(22) Filed: Jun. 2, 2023

(65) Prior Publication Data

US 2023/0306140 A1    Sep. 28, 2023

Related U.S. Application Data

(63) Continuation of application No. 17/039,348, filed on Sep. 30, 2020, now Pat. No. 11,687,676.

(51) Int. Cl.
*G06F 21/64* (2013.01)
*H04L 9/32* (2006.01)

(52) U.S. Cl.
CPC .......... *G06F 21/645* (2013.01); *H04L 9/3247* (2013.01); *H04L 9/3297* (2013.01)

(58) Field of Classification Search
CPC ... G06F 21/645; H04L 9/3247; H04L 9/3297; H04L 63/12; G06Q 50/18
See application file for complete search history.

(56) References Cited

U.S. PATENT DOCUMENTS 7,689,900 B1 *   3/2010   Fifield .................. H04L 9/3297
                                                            715/236
8,441,525 B2     5/2013   Masuda et al.
(Continued)

FOREIGN PATENT DOCUMENTS

CA    2018770 C     8/2007
CN    109218027 A   1/2019
(Continued)

OTHER PUBLICATIONS

Boudrez, F. Digital signatures and electronic records. Arch Sci 7, 179-193 (2007). https://doi.org/10.1007/s10502-007-9058-2 (Year: 2007).*

(Continued)

*Primary Examiner* — Sher A Khan
(74) *Attorney, Agent, or Firm* — Shumaker & Sieffert, P.A.

(57)     ABSTRACT

A platform implements a remote online notarization service. The remote online notarization (RON) service allows notarization of digital documents which have been electronically signed. The RON process can be initiated by a facilitator and involves participants including one or more signers and a notary. The RON service provided by the present system confirms technical features of each participants device used to participate in the RON process. Once a participant's device is verified and the participant is verified, the participant is provided with access to a notarization session in which the notarization takes place. The service provides a manageable, reliable platform for implementing a RON process based on features including digitally witnessing of document e-signing, use of custom notary stamps, and creation of unique notary journal entries.

20 Claims, 29 Drawing Sheets

(56) References Cited

U.S. PATENT DOCUMENTS

| | | | |
|---|---|---|---|
| 8,549,303 B2* | 10/2013 | Fifield | H04L 63/12 |
| | | | 707/703 |
| 9,813,670 B2 | 11/2017 | Rung et al. | |
| 10,110,385 B1 | 10/2018 | Rush et al. | |
| 10,122,535 B2* | 11/2018 | Raduchel | G06F 21/6272 |
| 10,373,277 B2 | 8/2019 | Kaminski et al. | |
| 10,402,784 B2* | 9/2019 | Hackler | G06Q 10/10 |
| 10,671,712 B1 | 6/2020 | Lindley et al. | |
| 10,769,360 B1 | 9/2020 | Arnold et al. | |
| 11,687,676 B2 | 6/2023 | Hardy et al. | |
| 11,869,017 B1* | 1/2024 | Gaeta | G06Q 50/18 |
| 2002/0143704 A1 | 10/2002 | Nassiri | |
| 2003/0070072 A1* | 4/2003 | Nassiri | H04L 9/3247 |
| | | | 713/168 |
| 2003/0212893 A1 | 11/2003 | Hind et al. | |
| 2005/0120217 A1* | 6/2005 | Fifield | H04L 9/3297 |
| | | | 713/176 |
| 2005/0188204 A1* | 8/2005 | Rice | H04L 9/3263 |
| | | | 713/176 |
| 2006/0039471 A1 | 2/2006 | Dane et al. | |
| 2006/0224895 A1 | 10/2006 | Mayer | |
| 2008/0100874 A1 | 5/2008 | Mayer | |
| 2008/0209516 A1 | 8/2008 | Nassiri | |
| 2009/0327144 A1 | 12/2009 | Hatter et al. | |
| 2010/0161968 A1* | 6/2010 | Pravetz | H04L 9/3247 |
| | | | 726/28 |
| 2010/0161993 A1 | 6/2010 | Mayer | |
| 2011/0213700 A1* | 9/2011 | Sant'Anselmo | G06Q 20/10 |
| | | | 235/487 |
| 2013/0145007 A1 | 6/2013 | Randazzo et al. | |
| 2013/0325728 A1 | 12/2013 | Bialostok et al. | |
| 2014/0052564 A1 | 2/2014 | Lewis | |
| 2014/0164180 A1* | 6/2014 | Govin | G06Q 30/0613 |
| | | | 705/26.41 |
| 2014/0189728 A1 | 7/2014 | Lecomte et al. | |
| 2015/0026478 A1* | 1/2015 | Raduchel | H04L 9/3247 |
| | | | 713/176 |
| 2015/0150141 A1 | 5/2015 | Szymanski et al. | |
| 2015/0295922 A1 | 10/2015 | Dunn et al. | |
| 2015/0349962 A1* | 12/2015 | Rice | H04L 9/3247 |
| | | | 713/176 |
| 2016/0048841 A1* | 2/2016 | Johnson | G06Q 30/015 |
| | | | 705/304 |
| 2016/0057388 A1* | 2/2016 | Rung | G06Q 30/0281 |
| | | | 348/14.08 |
| 2016/0132807 A1* | 5/2016 | Camenzind | G06Q 50/18 |
| | | | 705/7.23 |
| 2016/0132818 A1 | 5/2016 | Camenzind et al. | |
| 2017/0004591 A1* | 1/2017 | Kaminski | H04L 63/083 |
| 2017/0019400 A1* | 1/2017 | Drolshagen | H04L 63/0861 |
| 2017/0352012 A1* | 12/2017 | Hearn | H04L 9/3247 |
| 2019/0121846 A1 | 4/2019 | Kim et al. | |
| 2019/0147554 A1 | 5/2019 | Chintala et al. | |
| 2019/0190724 A1* | 6/2019 | Sundaresan | H04L 9/3247 |
| 2019/0319948 A1 | 10/2019 | Triola et al. | |
| 2019/0354706 A1 | 11/2019 | Bartlett et al. | |
| 2019/0362508 A1 | 11/2019 | Anantha et al. | |
| 2020/0204370 A1 | 6/2020 | Wisniewski | |
| 2021/0110357 A1* | 4/2021 | Wisniewski | G06Q 50/167 |
| 2022/0116441 A1* | 4/2022 | Liu | H04L 65/65 |
| 2022/0284526 A1* | 9/2022 | Hardy | H04L 67/141 |

FOREIGN PATENT DOCUMENTS

| | | | | |
|---|---|---|---|---|
| CN | 109544094 A | * | 3/2019 | |
| GB | 2478554 A | * | 9/2011 | G06F 21/645 |
| JP | H10327147 A | | 12/1998 | |
| JP | 4120189 B2 | * | 7/2008 | |
| KR | 19990025296 A | * | 4/1999 | H04L 9/3236 |
| KR | 19990033789 A | * | 5/1999 | H04L 9/321 |
| KR | 20020042382 A | * | 6/2002 | |
| KR | 20090041570 A | * | 4/2008 | |
| KR | 20080043287 A | * | 5/2008 | |
| KR | 20170096808 A | | 8/2017 | |
| KR | 20200103775 A | | 9/2020 | |
| WO | 2012021734 A1 | | 2/2012 | |
| WO | WO-2013105941 A1 | * | 7/2013 | G06F 21/16 |
| WO | WO-2020051643 A1 | * | 3/2020 | G06F 21/305 |

OTHER PUBLICATIONS

International Preliminary Report on Patentability from International Application No. PCT/US2021/043031 dated Mar. 28, 2023, 5 pp.

International Search Report and Written Opinion, Patent Treaty Cooperation Application No. PCT/US2021/043031, Oct. 29, 2021, 11 pages.

International Search Report and Written Opinion, Patent Treaty Cooperation Application No. PCT/US2022/017860, Jun. 8, 2022, 19 pages.

Prosecution History from U.S. Patent Application No. 1304-058US01, now issued U.S. Pat. No. 11,687,676, dated Sep. 8, 2022 through May 26, 2023, 55 pp.

Extended Search Report from counterpart European Application No. 21876169.0 dated Feb. 13, 2025, 7 pp.

Response to Extended Search Report dated Feb. 13, 2025, from counterpart European Application No. 21876169.0 filed Apr. 16, 2025, 17 pp.

* cited by examiner

PLATFORM FOR PROVIDING REMOTE ONLINE NOTARIZATION SERVICE

CROSS-REFERENCE TO RELATED APPLICATION

The present application claims the benefit of U.S. Utility patent application Ser. No. 17/039,348 filed on Sep. 30, 2020, which is hereby incorporated by reference in its entirety.

BACKGROUND

Some types of transactions between parties require not only that they be described in a written document, but include additional assurances that the signatures on the document are valid. For decades, notarization of a signed document has been used to assure that document signatures are valid. With a global economy, it can be inconvenient to obtain a notary in person. What is needed is a system for providing additional assurance to ensure that document signatures are valid.

SUMMARY

The present technology, roughly described, provides a platform for implementing a remote online notarization service. The remote online notarization (RON) service allows notarization of digital documents which have been electronically signed. The RON process can be initiated by a facilitator and involves participants including one or more signers and a notary. The RON service provided by the present system confirms technical features of each participants device used to participate in the RON process. Once a participant's device is verified and the participant himself is verified, the participant is provided with access to a notarization session in which the notarization takes place.

The present system provides several features to provide a manageable, reliable platform for implementing a RON process with an RON server. For example, the RON process may be managed and edited by a facilitator before or during the session. The facilitator can be a notary or a different person. When signers electronically sign a document, the RON server allows a notary to digitally witness the signing. After a document is electronically signed, a notary may electronically notarize the document using a custom notary stamp and a notary signature. Once a document is notarized, the RON server creates a unique, tamper-evident notary journal. The notary journal includes participant information, document information, data regarding the date and time of the notarization session, session metadata, and a video of the session. The session metadata may include keystroke information, actions, IP address information, geolocation, and other data captured during the session. In some instances, the RON server implements tamper evident features by generating an x509 certificate for the unique notary journal. The x509 certificate comprises a unique notary journal entry and a video of the notarization session.

In some instances, a method for providing a remote online notarization session includes initializing, by a remote online notarization (RON) server, a notarization session for remotely performing a notarization of a document over a network. The RON server transmits a unique electronic invitation to one or more signer devices, each of which is associated with an individual to provide an electronic signature on the document. The RON server also transmits a unique electronic invitation a notary device associated with a notary. The RON server compares, via a RON application at the RON server, a plurality of technical capabilities of each signer device and the notary device to a threshold for each capability. The RON server also receives identification data and knowledge data for each of the one or more signers. The RON server provides access to the notarization session to each of the one or more signer devices based on a credential analysis performed at each signer device. In some embodiments, the RON server provides access further based on the plurality of technical capabilities comparison and a verification of the received identification and knowledge data for the respective signer.

The RON server receives a first electronic signature from one of the one or more signers. Responsive to receiving the first electronic signature, the RON server transmits, for display on the notary device, an image of the document being electronically signed with the first electronic signature. The RON server modifies the document to include the first electronic signature. The RON server receives, from the notary device, a digital notarization seal for the document. The RON server may also receive a second electronic signature from the notary device. The RON server modifies the document, via the RON application, to include the second electronic signature and the digital notarization seal. The RON server generates a digital notary journal signer, which includes a video of the notarization session.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF FIGURES

FIG. 14 is an interface provided by a RON application for collecting participant information.

FIG. 16 is an interface provided by a RON application for obtaining participant information for a knowledge-based authentication check.

Figure 1:
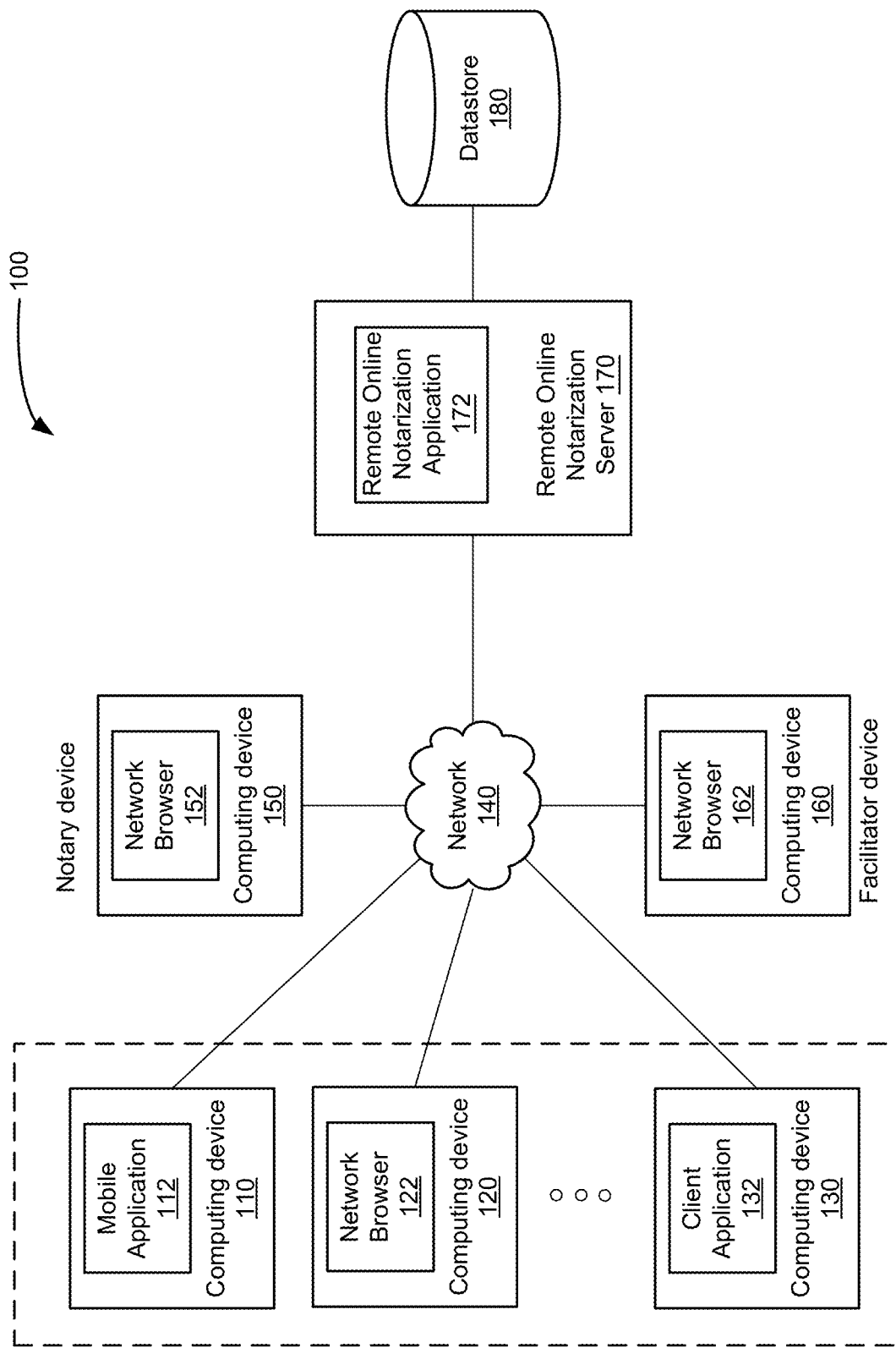
FIG. 1 is a block diagram of a system for providing a remote online notarization session.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

The present system provides a platform for implementing a remote online notarization service. The remote online notarization (RON) service allows notarization of digital documents which have been electronically signed. The RON process can be initiated by a facilitator and involves participants including one or more signers and a notary. The RON service provided by the present system confirms technical features of each participants device used to participate in the RON process. Once a participant's device is verified and the participant himself is verified, the participant is provided with access to a notarization session in which the notarization takes place.

The present system provides several features to provide a manageable, reliable platform for implementing a RON process. For example, the RON workflow may be managed and edited by a facilitator before or during the notarization session. When signers electronically sign a document, the present system allows a notary to digitally witness the signing. After a document is electronically signed, a notary may electronically notarize the document, using a custom notary stamp and a notary signature. Once a document is notarized, the system creates a unique notary journal entry. The notary journal entry includes participant information, document information, data regarding the date and time of the notarization session, session metadata, and a video of the session. The metadata may include keystroke information, actions, and other data captured during the session.

In some instances, access to the notarization session may be provided automatically or in response to input received by a notary. For example, the present system can implement logic that automatically provides access to a participant that successfully completes a technical analysis, credential analysis, and a knowledge-based authentication (KBA) analysis. For example, if a signer's device complies with one or more technical capability thresholds and the signer successfully provides credential information and answers KBA questions correctly, the present system may automatically provide the signer's device access to the notarization session. In some instances, a notary and/or facilitator can manually review the results of the technical analysis, credential analysis, and KBA results, and determine whether to grant the participant access to the notarization session.

There are several technical problems related to the field of document notarization that have not been previously solved. First and foremost, there is no single service that provides for remote online notarization. Most regulations have been satisfied with in-person notarization, and no service has provided a technical solution to providing a notarization service that is as reliable as an in-person notary. With a global and distributed economy, however, there is a growing need for a platform that implements a notarization process as a single service. Another issue is allowing participants to the remote online notarization into the session, and based on what criteria. Since participants can be verified in person, exactly how they are verified and when and how a system admits the participant to a session has not been solved by previous technical solutions.

The present system disclosed herein provides a technical solution for the technical problems existing in the field of document signing and notarization. The present, system, for example, provides a single platform for addressing all parts of the notarization process. The platform provides for verifying users and notary participants, managing a session by a facilitator, notarizing a document, creating a notary journal, and additional features. The platform provides a reliable, automated process and system for securely and reliably notarizing documents. The platform is implanted on servers executing code that automatically verifies and admits notarization session participants, automatically manipulates participant devices to provide signature updates as well as electronic signature witnessing, and automatically creates a secure and trusted unique journal entry for a notarization transaction.

The present system solves the problem of admission of participants to the session using a three-part analysis of the participant device and the participant information provided through the participant device. The present system performs a technical check for each participant device. If the technical check meets certain thresholds, the system automatically and seamlessly performs a credential analysis and KBA analysis for the participant. The system automatically operates to admit a participant into a notarization session if the participant passes the technical device check, credential analysis, and KBA analysis. If the system detects that the participant does not pass one of these checks and/or analysis steps, the system will not admit the participant device to enter the remote online notarization session.

The present system solves the technical issue of electronic signature witnessing by automatically providing one or more participants, including in some instances a notary, update messages of the status of other participant signing. Additionally, the present system may detect that an electronic signature is imminent, and in response to the detection can automatically control the display of one or more other participants, such as a notary, to scroll to a portion of a document where the electronic signature is occurring. In this manner, the present system automatically allows a notary to witness another participant electronically sign the document being notarized.

FIG. 1 is a block diagram of a system 100 for providing a remote online notarization (RON) session. The block diagram of FIG. 1 includes signer devices including computing device 110, computing device 120, and computing device 130, a notary device including computing device 150, a facilitator device including computing device 160, network 140, remote online notarization server 170, and database 180.

The signer devices may be implemented as any device which can provide output and communicate with a remote online notarization server 170. Computing devices 110-130 may be mobile devices, desktop devices, or other computing devices. Each computing device may store code which implements a mobile application 112, network browser 122, or client application 132. Each of applications 112, 122, and 132 may receive data, including content page data, from server 170 and display the content pages to a signer associated with the particular computing device. In some instances, the RON can be implemented through a network browser 122, such as for example one or more webpages The applications, such as network browser 122, executing on computing devices 110-130 may allow a signer to confirm device technical capabilities, enter a notarization session, perform an electronic signature, and otherwise perform functionality discussed herein.

Computing device 150 associated with a notary can be implemented with a mobile application, client application, or network browser, such as network browser 152. Computing device 160 associated with a facilitator may also include a mobile application or client application. Computing devices 150-160 may receive content pages and otherwise communicate with server 170. Notary device 150 may allow a notary to witness electronic signing, notarize an electronically signed document, participate in a RON journal entry creation operation, access past notarization journal entries, and perform other functionality discussed herein. Computing device 160 associated with the facilitator may allow the facilitator to control notarization session parameters, control and manage a RON session workflow, and otherwise manage a RON notarization session.

Network 140 may include any network suitable for communicating data between computing devices 110-160 and remote online notarization server 170. Network 140 may be implemented using one or more local area networks, wide-area networks, physical machines, the Internet, an intranet, a Wi-Fi network, telephone network, a cellular network, and other networks over which data can be communicated.

Remote online notarization server 170 may communicate with computing devices 110-160 and datastore 180. Remote online notarization server 170 may include one or more servers to implement the function described herein.

Server 170 may include a remote online notarization application 172. The RON application 172 may perform functionality described herein and implement in a RON session for participants including one or more signers and a notary. For example, the RON application 172 may be stored in server memory and executed by one or more processors to manage a notarization process, verify participants, create, edit, and store a notarization journal, manage a notarization session in which the notarization occurs, perform electronic signing of a document, and other functionality. In some embodiments, some or all modules of the RON application 172 may be run by a remote system (e.g., by an application installed thereon) that may communicate with the server 170 or a server-side application. RON application 172 is discussed in more detail with respect to the block diagram of FIG. 5.

Datastore 180 may include data accessible by application 172, server 170, and directly or indirectly by facilitator device 160 and notary device 150. In some instances, datastore 180 may include signer data, journal entry data, templates for RON sessions, and other data.

Figure 2:
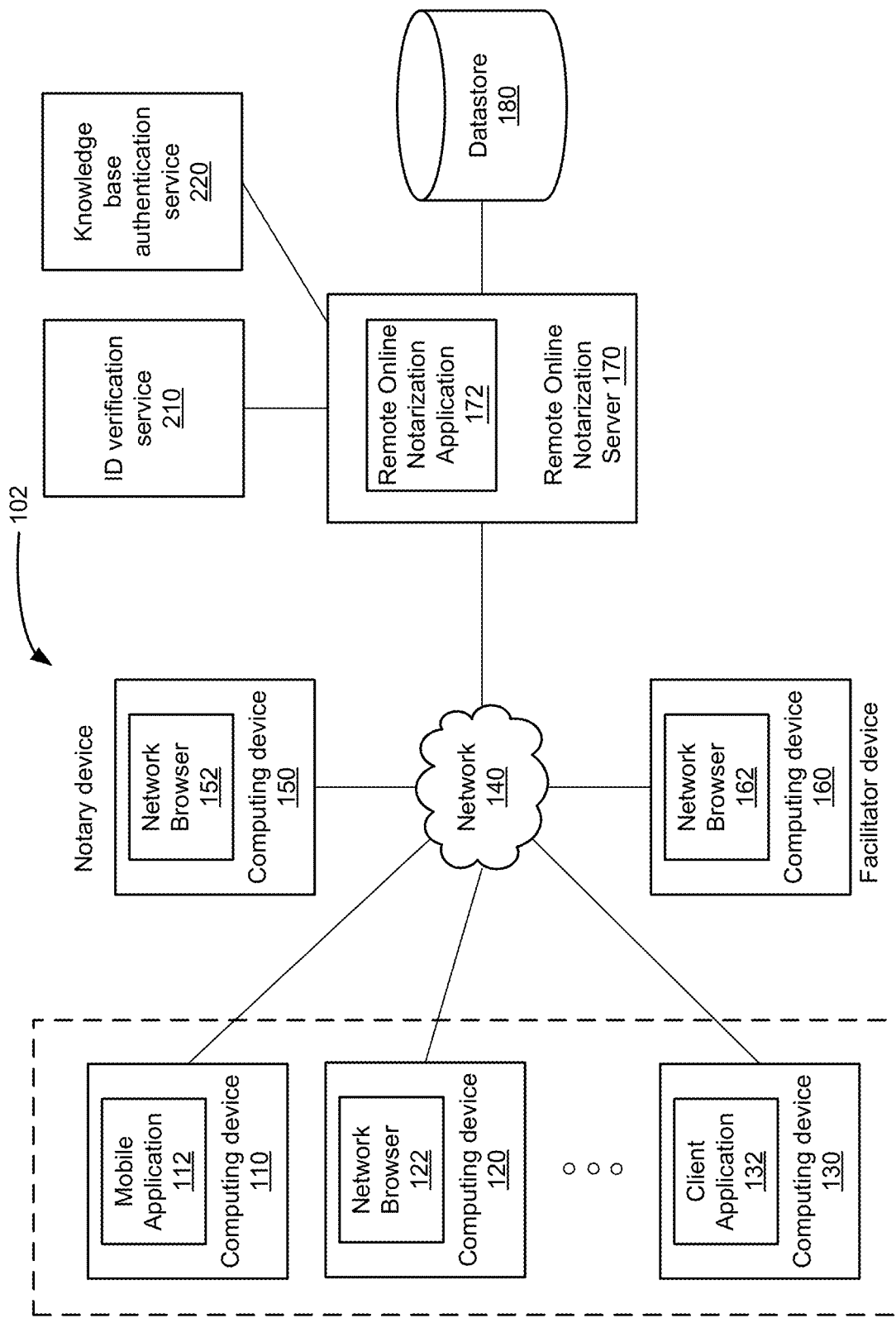
FIG. 2 is a block diagram of a system for providing a RON session using a remote credential analysis service and a remote knowledge-based authentication service.

FIG. 2 is a block diagram of a system 102 for providing a RON session using a remote credential analysis service 210 and a remote KBA service 220. The block diagram 102 of FIG. 2 is similar to block diagram 100 of FIG. 1 except that remote online notarization server 170 may communicate with credential analysis service 210 and knowledge-based authentication service 220. The credential analysis service 210 may process identification documents to confirm proper identification of a RON session participant. For example, credential analysis service 210 may confirm a driver's license or a passport for a participant. Knowledge-based authentication (KBA) service 220 may confirm a participant based on their knowledge associated with participant history. In some instances, KBA service 220 confirms user knowledge by asking questions associated with a participant credit report, such as for example participant past addresses, past loans, past credit accounts, and other details of a participant's credit report.

In operation, RON server 170 may perform a participant credential analysis by connecting with services 210 and 220 via APIs, obtaining information from a participant at computing devices 110-150, providing information to the particular service, and admitting the participant to the RON session based on the results provided by the credential analysis service 210 and/or KBA service 220.

Figure 3:
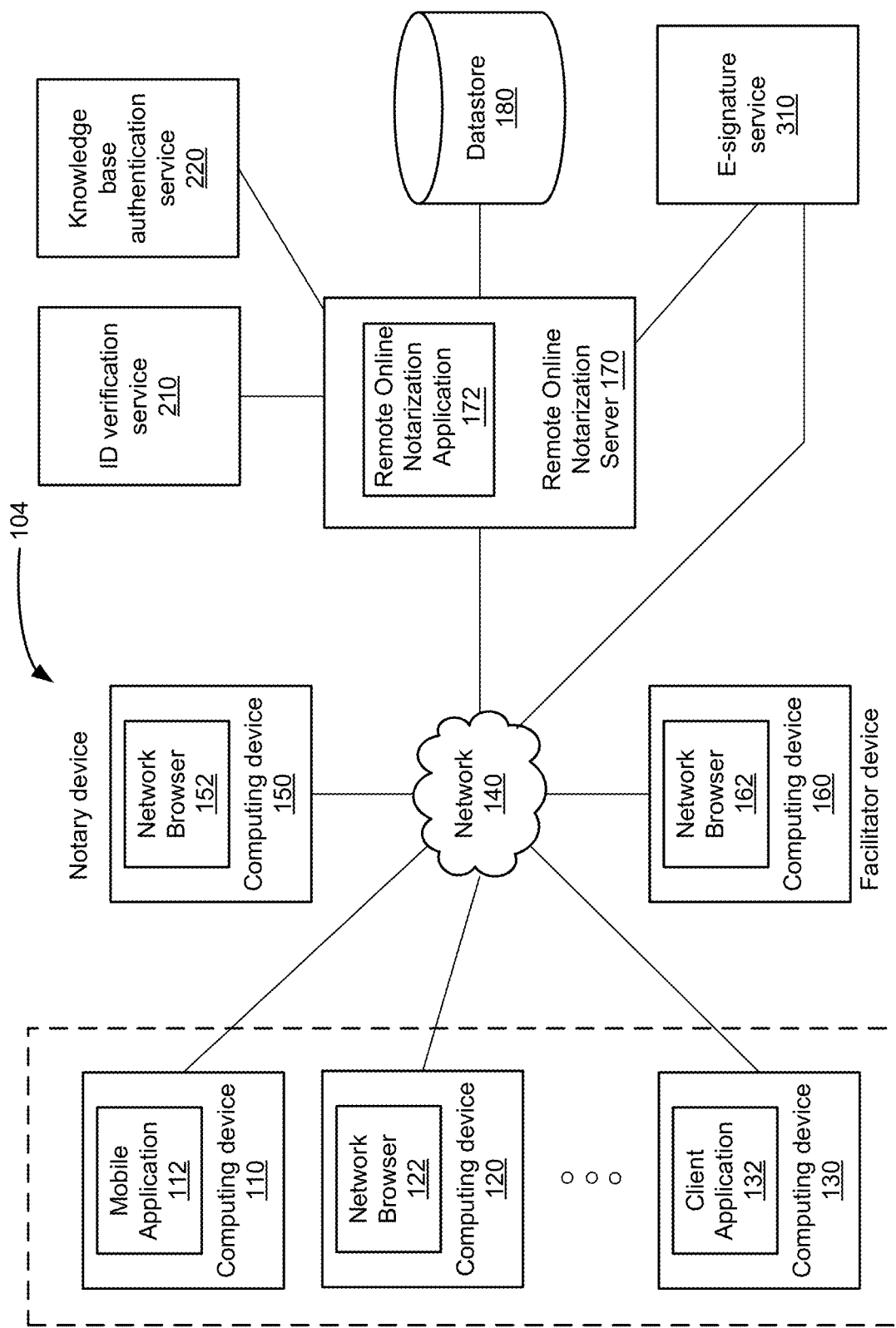
FIG. 3 is a block diagram of a system for providing a RON session using a remote e-signature service.

FIG. 3 is a block diagram of a system for providing a RON session using a remote e-signature service. The block diagram 104 of FIG. 3 is similar to block diagram 100 of FIG. 1 except that RON server 170 may communicate with e-signature service 310. In this embodiment, RON server 170 may connect with service 310 through the appropriate APIs or other suitable connections, and act as a conduit between the e-signature service 310 and signers signing a document through computing devices 110-130. Once signed, e-signature service 310 may provide the document to RON server 170 for notarization.

As illustrated in FIG. 3, e-signature service may communicate with remote online notarization server 170 and other devices via network 140. For example, e-signature service 310 may communicate with notary device 150, facilitator device 160, and signer devices 110-130 over network 140.

Figure 4:
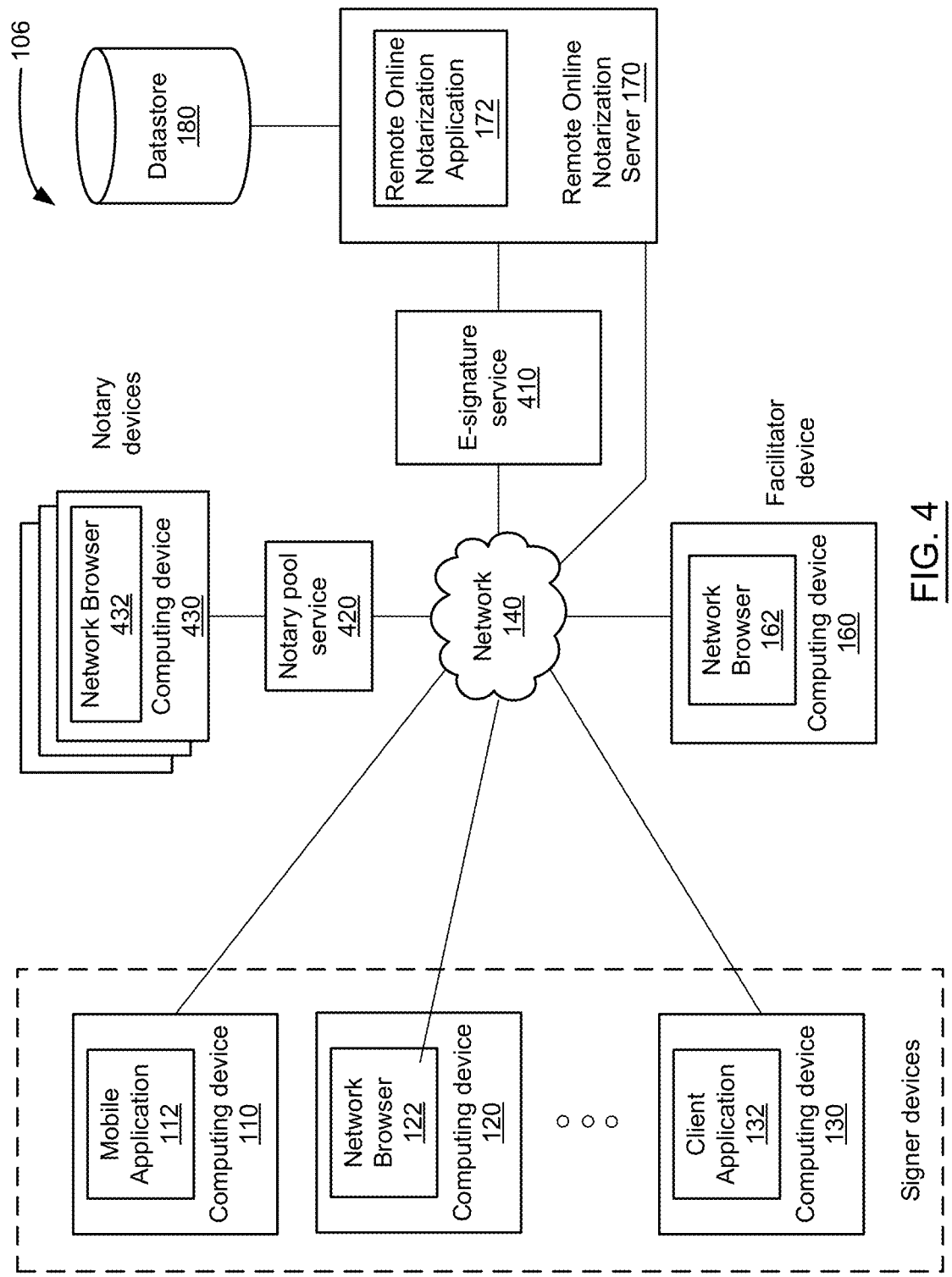
FIG. 4 is a block diagram of a system for providing a RON session through an e-signature service which accesses a remote online notarization server.

FIG. 4 is a block diagram of a system for providing a RON through an e-signature service which accesses a remote online notarization server 170. System 106 of FIG. 4 is similar to system 104 of FIG. 3 except that e-signature service 410 is implemented between signer computing devices 110-130, notary computing device 430, and RON server 170. As such, the e-signature service 410 may implement a RON session for the participants. Hence, the RON session is implemented through e-signature service 410, which accesses the platform provided by RON server 170 and provides content pages to signer computing devices 110-130, as well as a notary associated with computing device 430.

In the system 106 of FIG. 4, a notary associated with computing device 430 may be selected by notary pool service 420. In this instance, when a notary is needed, notary pool service 420 may select a notary from a pool of notaries. For example, notary pool service 420 may manage a pool of a plurality of notaries, wherein each notary may be associated with a record having data such as document type experience, availability, rating, contact information, and other data. The notary pool service may select a particular notary based on the document to be notarized, time of day, and other data, and connect the notary to the e-signature service for 10 for notarizing a document for the RON service.

As illustrated in FIG. 3, remote online notarization server 170 may communicate with e-signature service 410 and other devices via network 140. For example, remote online notarization server 170 may communicate with notary devices 430, facilitator device 160, and signer devices 110-130 over network 140.

Figure 5:
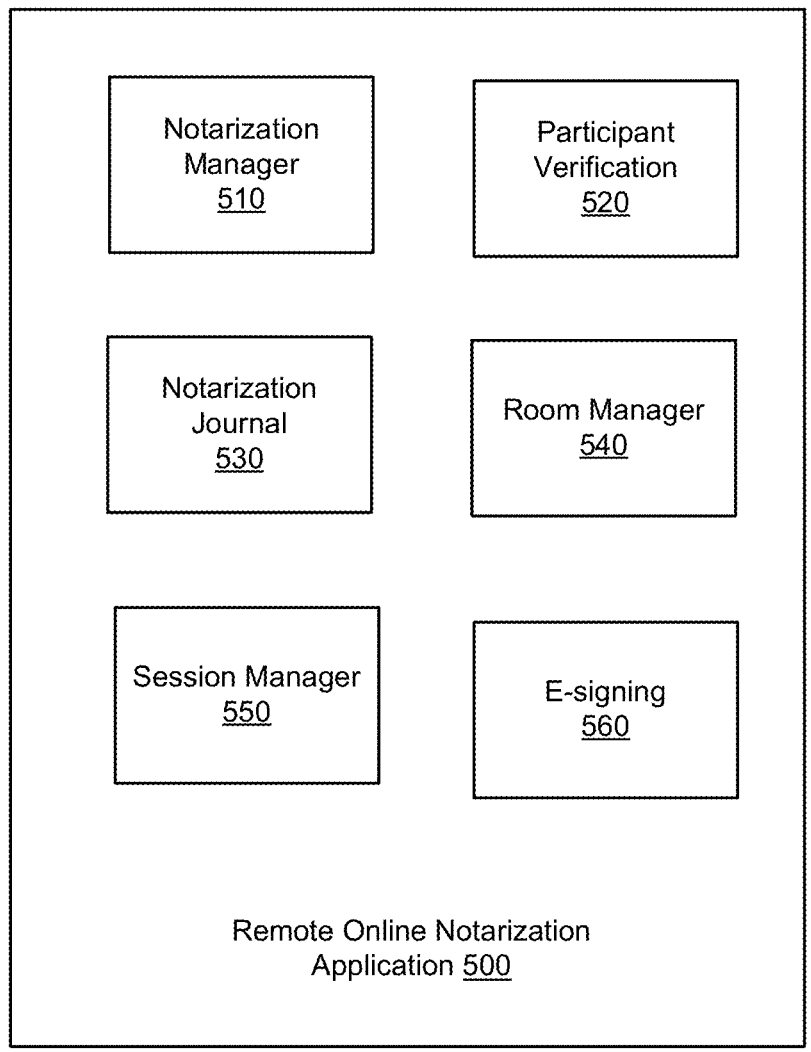
FIG. 5 is a block diagram of a remote online notarization application.

FIG. 5 is a block diagram of a remote online notarization application. The remote online notarization application 500 provides more detail for RON applications illustrated in FIGS. 1-4. RON application 500 includes notarization manager 510, participant verification 520, notarization journal 530, room manager 540, session manager 550, and e-signing module 560.

A notarization manager 510 may manage a notarization process for a RON application. Management of the notarization process may include detecting when all the signatures are complete, obtaining a notarization stamp from a notary, obtaining an electronic signature from a notary, and other aspects of managing the notarization process.

Participant verification module 520 may perform a participant identification verification as well as a KBA verification process for each participant. In some instances, participant verification module 520 may perform the verifications itself. In some instances, participant verification module 520 may communicate with external services which provide a credential analysis and KBA verification process, gather data from participants needed for the verifications, and inform room manager 540 and session manager 550 based on the verification results.

Notarization journal 530 may manage creation of the notarization journal for a particular notarization session. Notarization journal 530 may include participant data, notarization session data, metadata associated with the notarization session, video data of the notarization session, and other data. Notarization journal 530 may create a notarization journal entry based on the session data, encrypt the data, and provide a notarization journal entry to the notary. Notarization journal module 530 may also enable a notary to access past notarizations performed with the RON system.

Room manager 540 may manage aspects of a RON session room in which a notarization session is a current. For example, room manager 540 may handle participant invitations to a room, block or remove participants from a room, provide updates and notifications regarding room changes, and otherwise handle room settings.

Session manager 550 may manage RON session settings. For example, session manager 550 may determine the order of e-signature signings, record participant keystrokes and actions, videotape the session, and otherwise manage session settings.

E-signing module 560 may generate e-signatures from users and insert them into the document to be notarized. E-signing module 560 may allow a user to review the document, prompt a user to provide an e-signature, collect the e-signature provided by the signer, add the e-signature to the document, and generate a security certificate for the document with the added e-signatures.

Figure 6A:
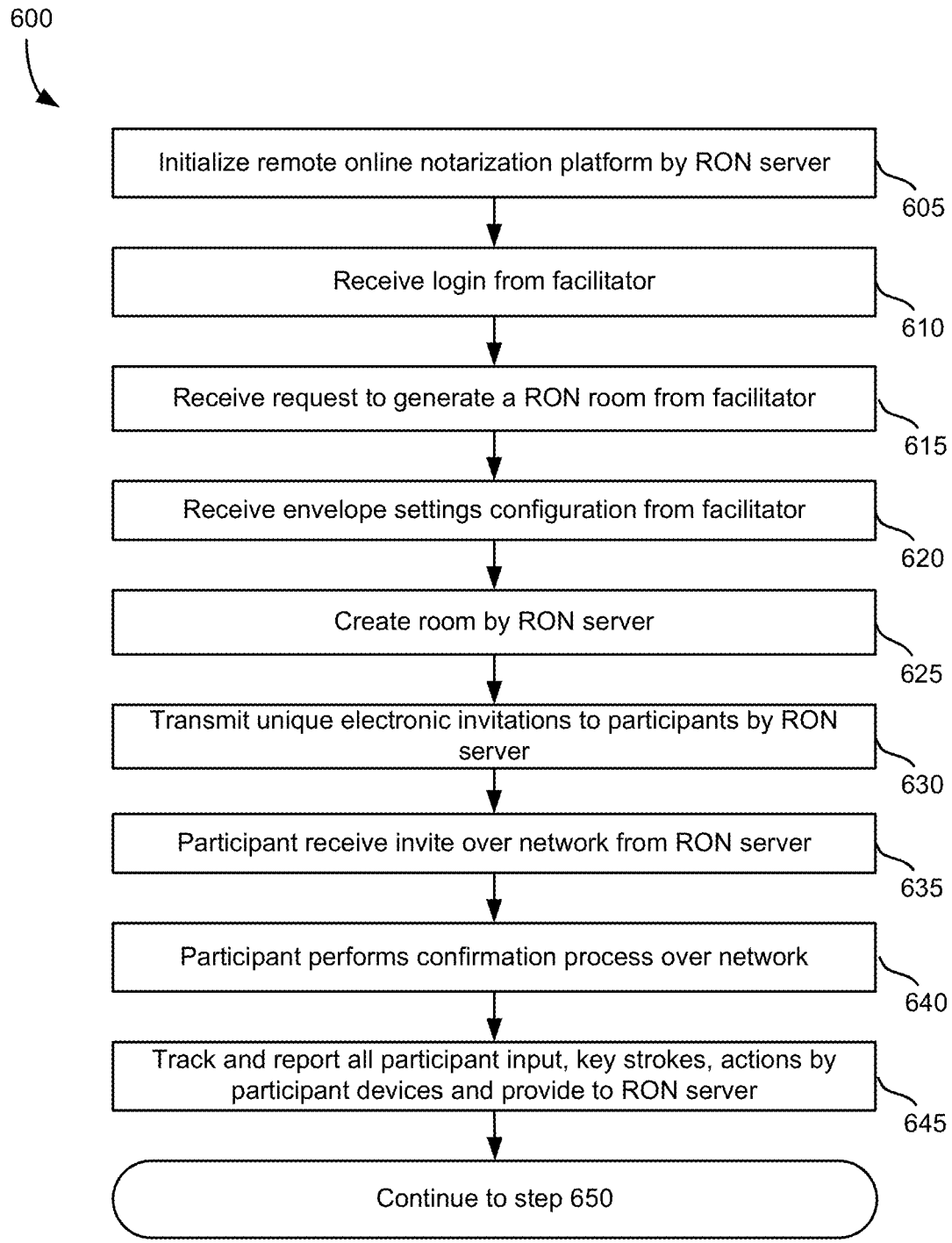
FIG. 6A illustrates a first portion of a method for providing a remote online notarization service.
Figure 6B:
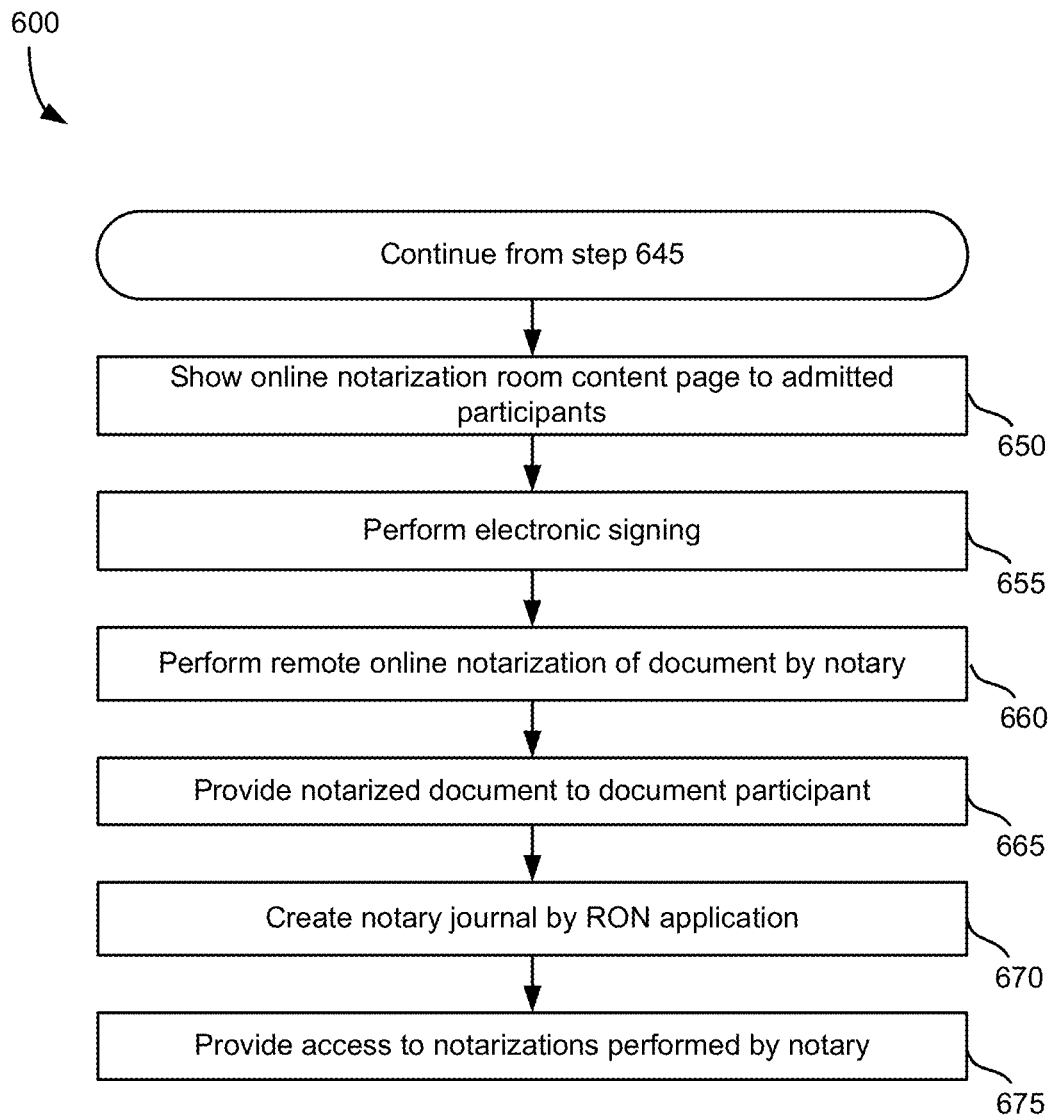
FIG. 6B illustrates a second portion of a method for providing a remote online notarization session.

FIGS. 6A-B illustrate a method for providing a remote online notarization session. The method of FIG. 6A begins with initializing a remote online notarization platform by a RON server at step 605. Initialization may include executing one or more applications to implement a RON session, perform maintenance, and execute updates.

A login is received from the facilitators received at step 610. In some instances, a facilitator may have an account with the RON application. Login may include a username and/or password, or other login data.

A request is received to generate a RON room for a notarization session from a facilitator at step 615. Notarization session settings to configure the room may be received from a facilitator at step 620. The notarization session settings may include a list of participants to invite, room settings such as facilitator logos, number of participants, date, and time to invite participants, and individuals that should be blocked from the RON room. In some instances, the participants may include one or more signers and a notary, and may include contact information such as an email and/or phone number for each participant.

After receiving the notarization session settings, a RON server creates the RON room for the notarization session at step 625 by initializing the notarization session from remotely performing a notarization of a document. Creating a RON room may include setting a notarization session name and identifier, accessing a document for signature, and sending out invites to the list of participants. The notarization session may include an expiration date, and a status (such as vacant or occupied).

Unique electronic invitations are transmitted to the participants of the RON session associated with the notarization session at step 630. The unique electronic invitations may include identifiers, wherein a unique identifier is associated with each participant for the session. Participants receive the unique electronic invitations from over a network from the RON server at step 635. Participants may receive the invite as, for example, an email message or a text message.

A participant that receives a unique electronic invitation may perform a confirmation process over network at step 640. The confirmation process may include performing a hardware capability test, a credential analysis, and a knowledge verification. More details for performing a confirmation process for a participant are discussed with respect to the method of FIG. 7 and the interfaces of FIGS. 11-15.

If a participant fails the confirmation process, a participant is not admitted to the RON room configured by the facilitator. If a participant successfully completes the confirmation process, all participant input, keystrokes, and actions by the participant's computing device are provided to a RON server at step 645 and the user is admitted to the RON room at step 650. In particular, the user is provided access to the notarization session through their computing device based on the credential analysis, hardware capability test, and/or knowledge verification. An online notarization room content page is provided to computing devices associated with the admitted participants at step 650. The online notarization room content page provides a view of the document, images of one or more participants, a signing order, and a prompt to start an electronic signing process. The images of the participants may include a status of each participant, and optionally other data. The status may include video toggle information and audio toggle information. In some instances, each signer may provide an image of a form of identification for the notary to view, or hold up their identification during the video to show the notary during the session, as or just before the signer signs the document.

Electronic signing is performed at step 655. Performing the electronic signing of the document may include obtaining electronic signatures from each signer, in a designated order, and allowing a notary to witness each electronic signature through a display on the device associated with the notary. In some embodiments, in response to receiving an electronic signature from a signer's computing device, the RON server 170 transmits, for display at the notary's computing device, an image of the document being electronically signed with the electronic signature and modifies the document to include the electronic signature. Performing electronic signatures for a document is discussed in more detail below with respect to the method of FIG. 8.

The notarization is performed on the document at step 660. The notarization process may include providing notifications that the document has been electronically signed and that the remote online notarization process is beginning. Input may be received from the notary to notarize a document, obtain an image of the notary stamp, and then notarize the document itself. For instance, the RON server 170 may receive, from the notary's computing device, an electronic signature associated with the notary and a digital notarization seal (or stamp) and modify the document to include the electronic signature and the digital notarization seal. More details for performing a remote online notarization are discussed with respect to the method of FIG. 9 and the interfaces of FIGS. 19-25.

The notarized document is provided to the document recipient at step 665. The recipient may include a facilitator, a signer, or an entity for which the document is being executed, such as financial institution.

Figure 25:
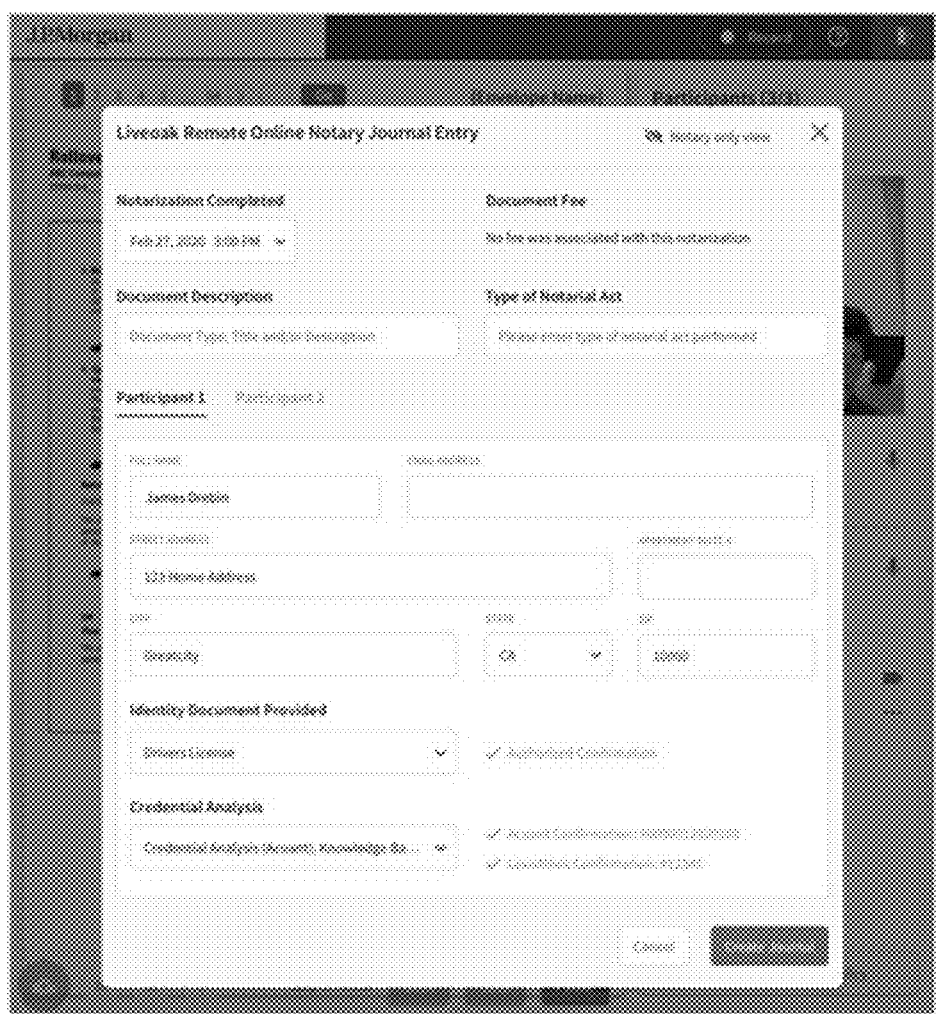
FIG. 25 is an interface for creating a notary journal.

A notary journal entry may be created at step 670. For instance, the RON server 170 may generate the digital notary journal including an electronic signature of the notary and a digital notarization seal. The notary journal entry may be generated to comply with jurisdictional laws and regulations and may memorialize the notarization of the document. The notary journal entry may include document information, participant information, and may ultimately be confirmed by the notary. More details for creating a notary journal entry are discussed with respect to the method of FIG. 10. An example of a notary journal entry is illustrated in the interface of FIG. 25.

Access to one or more notarizations performed by the notary may be provided at step 675. In some instances, a notary may wish to access past notary journal entries. As such, a notary may access these entries by accessing a searching interface provided by a RON application on the RON server via their computing device. An interface within a content page allowing a notary to access past notary journal entries is provided in FIG. 26.

Figure 7:
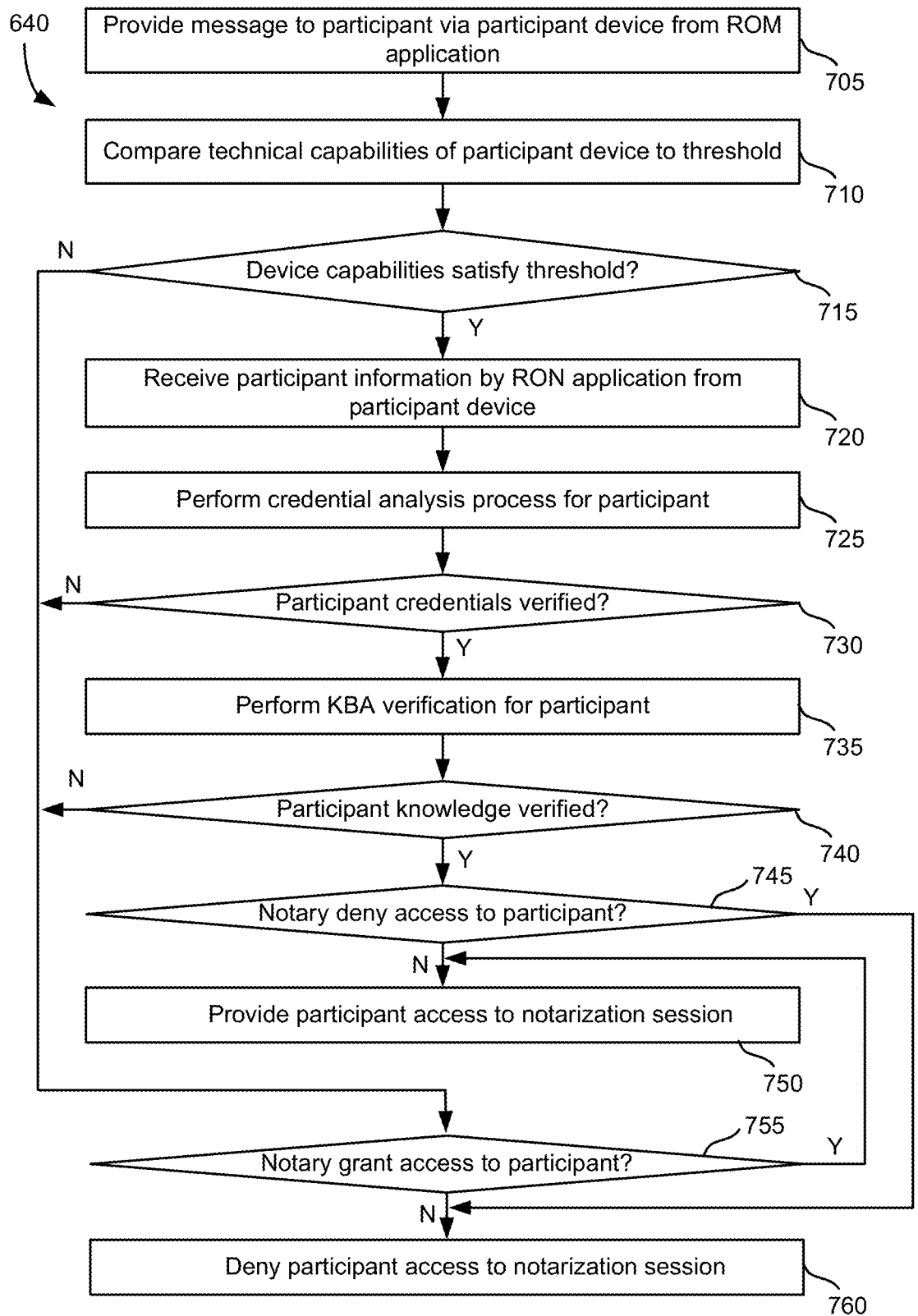
FIG. 7 is a method for a participant to perform a confirmation process over a network.

FIG. 7 is a method for a participant to perform a confirmation process over a network. A message is provided to a participant via the participant's computing device from a RON application at step 705. The message may include a welcome message to the participant, inviting the participant to begin the validation process. Technical capabilities are of the computing device used by the participant are accessed and compared to threshold levels at step 710. The technical capabilities may include a device video capability, such as functionality of a camera, audio capabilities of the computing device such as microphones and speakers, and networking capability such as the bandwidth of an Internet connection. When determining the video and audio capability, a user may confirm a video source and audio or microphone source. Illustrations of interfaces for performing hardware tests are provided in FIGS. 11-13. In some instances, a network connection and quality may be performed using a MOS process. The threshold levels for the computing device are used to ensure that the computing device may successfully participate in a RON session.

If the computing device's technical capabilities do not satisfy the threshold levels, the process of method 640 continues to step 755 where a determination is made as to whether the notary may grant the participant access to the notarization session (RON session). In some instances, a notary may override a failure in the participant verification process which would otherwise cause denial of the participant to join the notarization session. If the notary grants access to the participant at step 755, the participant is provided access to the digital room at step 750. If the notary does not override the participants failure to pass part of a credential or technical capability test, the participant is denied access to the notarization session at step 760. The denial may include an indication that the participant is denied access to the RON session based on the technical capabilities of their computing device.

Figure 14:
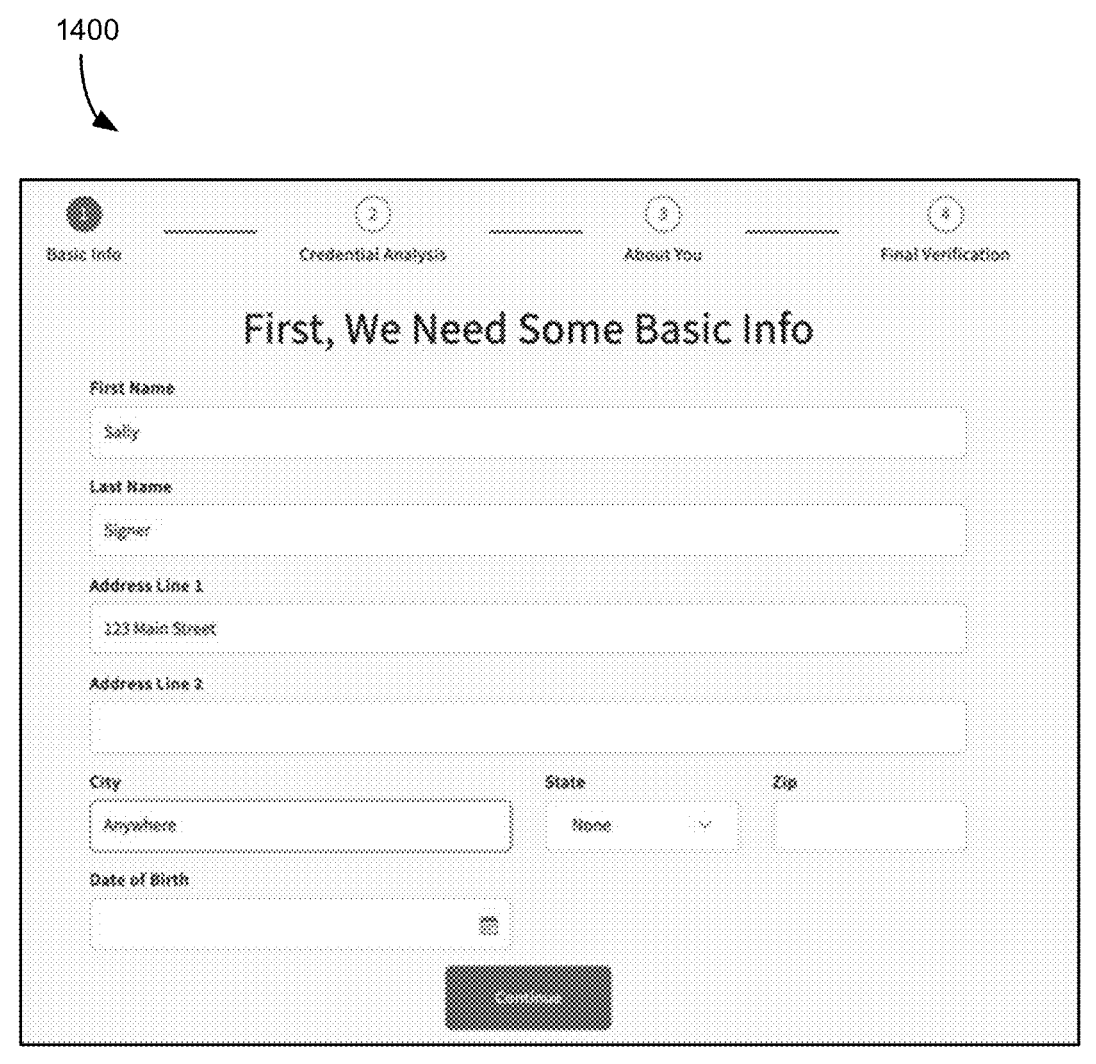

If computing device's technical capabilities satisfy the technical thresholds, participant information is received by the RON application from the participant device at step 720. The participant information may include name, address, contact information, and other data. A content page for obtaining the information from the participant is illustrated in FIG. 14.

An credential analysis process is performed by the participant at step 725. The credential analysis process confirms the user has a valid identification form. Suitable forms of identification may include, for example, a driver's license and/or a passport. Performing the credential analysis process may include obtaining images of the participant ID, such as a front image and back image of a driver's license, and submitting the images to a credential analysis service. The credential analysis service may process the images, obtain user information, and determine the authenticity of the form of identification.

A determination is made as to whether the participant credentials are verified at step 730. If the participant credentials are not verified at step 730, the process of method 640 continues to step 755 where a determination is made as to whether the notary may grant the participant access to the notarization session (RON session). In some instances, a notary may override a failure in the participant verification process which would otherwise cause denial of the participant to join the notarization session. If the notary grants access to the participant at step 755, the participant is provided access to the digital room at step 750. If the notary does not override the participants failure to pass part of a credential or technical capability test, the participant is denied access to the notarization session at step 760. A message may be displayed to the user indicating that the user's identification was not successfully verified.

Figure 16:
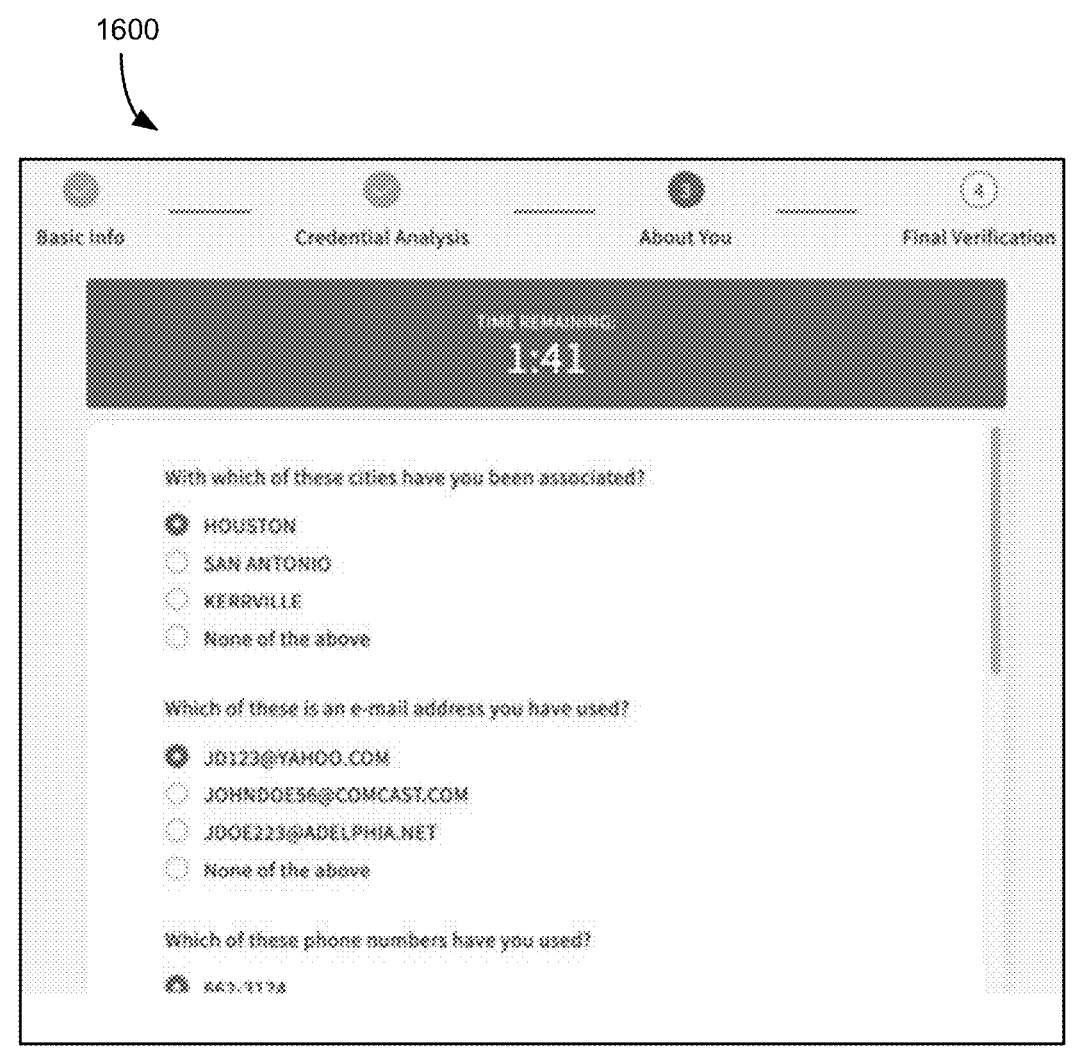

If the participant identification is verified at step 730, a knowledge-based authentication (KBA) process is performed for the participant at step 735. An example of a content page executing a KBA application process is illustrated in the interface of FIG. 16. The KBA authentication may include obtaining information from documents associated with the participant, such as a credit report, and asking a user to confirm their knowledge of the information. Identification verification may include asking a user about past addresses, past loans, and other data. If the participant knowledge verification is not successful, and the user does not successfully answer questions associated with the KBA process, the process of method 640 continues to step 755 where a determination is made as to whether the notary may grant the participant access to the notarization session (RON session). In some instances, a notary may override a failure in the participant verification process which would otherwise cause denial of the participant to join the notarization session. If the notary grants access to the participant at step 755, the participant is provided access to the digital room at step 750. If the notary does not override the participants failure to pass part of a credential or technical capability test, the participant is denied access to the notarization session at step 760.

Figure 17:
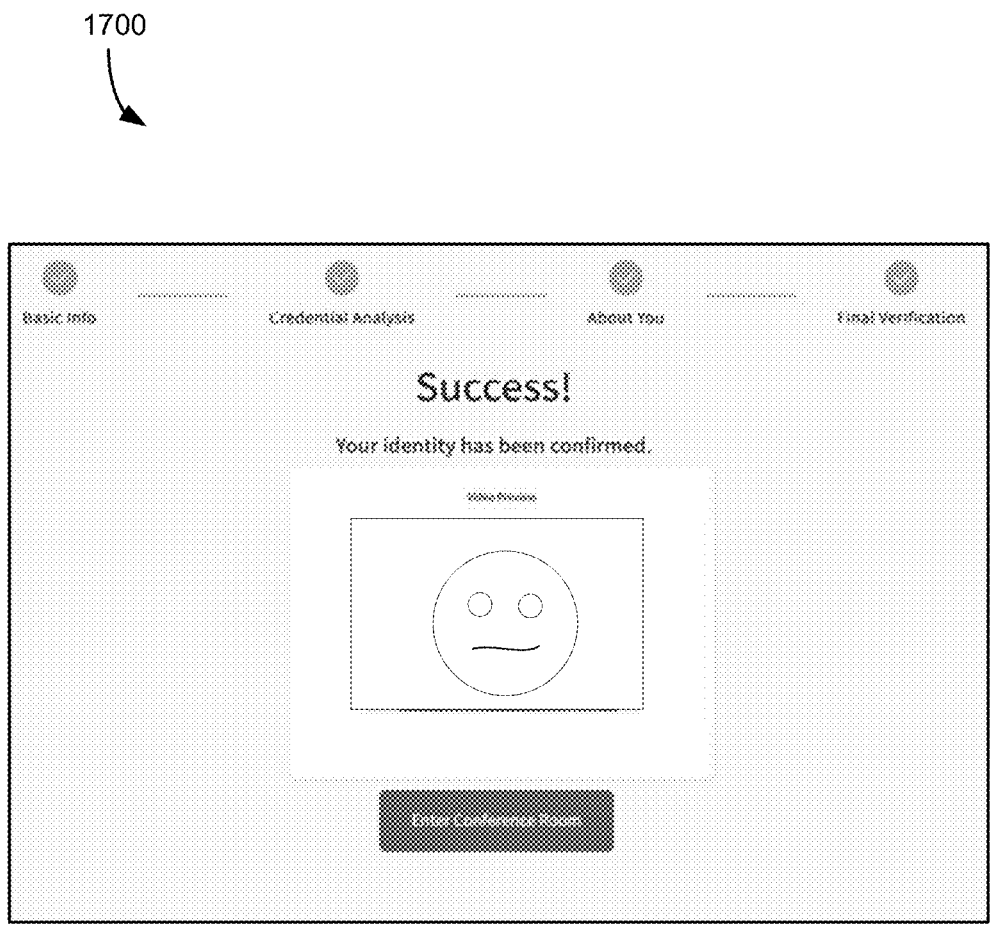
FIG. 17 is an interface provided by a RON application for confirming a user identity.

If the KBA verification is successful, a determination is made as to whether the notary denies access to the participant at step 745. In some instances, the notary may deny access to a participant despite the participant passing the technical thresholds, credential check, and KBA verification. For example, the notary may deny access if the computing device used by a participant appears to have been compromised or used by someone other than the participant after the participant is verified. In some instances, the notary may deny access to a participant for some other reason. If the notary denies access to the participant, the participant is denied access to the notarization session at step 760. If the notary does not deny access, the participant is provided access to the notarization session at step 750. An example of a content page provided to a user who is successfully admitted to a room is illustrated in FIG. 17.

Figure 8:
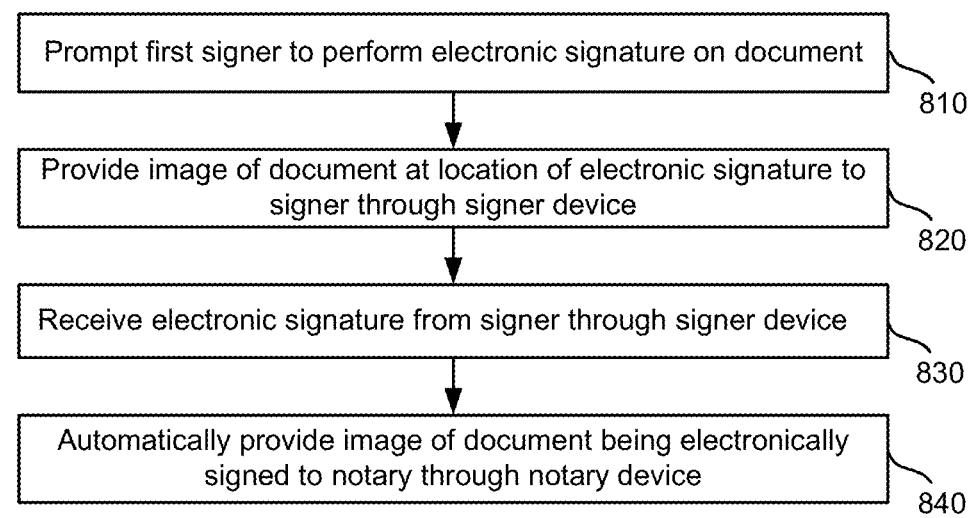
FIG. 8 is a method for performing an electronic signing of a document.

FIG. 8 is a method for performing an electronic signing of a document. The method of FIG. 8 provides more detail for step 655 of the method of FIGS. 6A-B. First, a first signer is prompted to provide an electronic signature on the document at step 810. The prompt may be provided through one or more pop-up messages, text, graphics, or other indicators on a content page provided by a RON application. An image of a document at the location of electronic signature is provided to the signer through the signer's computing device at step 820. Hence, a line at which the user is to sign is provided to the user after the user has had a chance to review the document through their device. The participant's electronic signature is then received from the signer through the signer's computing device and then provided to the RON application at step 830.

In some instances, the document can be e-signed with an electronic signature service that is embedded within the content page as an i-frame. In some instances, the remote electronic signature service is accessed through one or more APIs, a template for the signatures obtained, and the template is then populated with participant information. As information is received from the participant, it can then be provided to the electronic signature service. Once the signatures complete, the document is updated by the RON application.

While a user is electronically signing the documents, an image of the document being electronically signed is automatically provided to the notary through the notary's computing device at step 840. This enables the notary to witness the electronic signature by the signer to the document. The notary witnesses the signing by, for example, having the notaries view of the document automatically scroll to the portion of the document being signed by the signer at the time the signer is executing the signature.

Each signer may electronically sign the document in turn. Once all signers have electronically signed the document, a notification is provided to the signers that the signatures are complete, and a notification is provided to the notary that the document can now be notarized.

Figure 9:
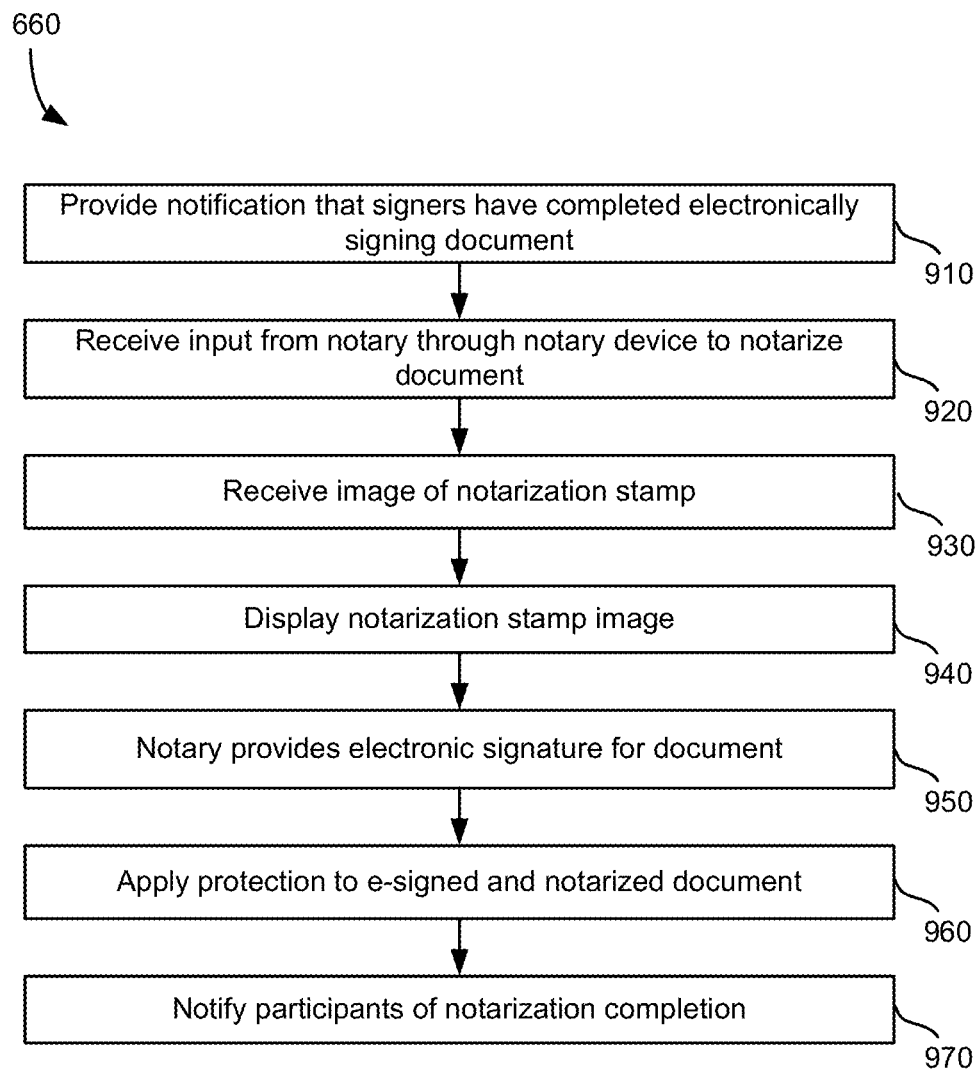
FIG. 9 is a method for performing a remote online notarization of a document by a notary.

FIG. 9 is a method for performing a remote online notarization of a document by a notary. The method of FIG. 9 provides more detail for step 660 of the method of FIGS. 6A-B. A notification is provided to the notary that the signers have completed electronically signing the document at step 910. Input is then received from the notary through the notary device to initiate the notarization process for the document at step 920.

An image of a notarization stamp is then received by the RON application from the notary device, and is positioned by the RON application at a position on the e-signed document next to the electronic signatures of the signers at step 930. In some instances, the notary stamp is placed at a position in the document that is designated for the notary stamp. The designated location may or may not be next to one or more signatures on the document.

The notarization stamp image is added to the document at step 940 and a notary provides his or her electronic signature for the document at step 950. In some instances, a notary document may not be electronically signed by the notary, but rather by the other participants. Examples of interfaces associated with notarizing an electronically signed document are provided in FIG. 19-24.

Protection to the electronically signed and notarized document is applied at step 960. In some instances, the protection may include encryption of the document, a certificate generated for the signed and notarized document, or some other protection. In some instances, a document may be protected, for example by encryption or certificate generation, at the occurrence of one or more events occur, such as for example when electronic signatures from signing participants are received and placed into the document, after a notary signs a document, after a notary stamp is placed in a designated or other location within the document, or in response to some other event. Hence, in some instances, either one or both of steps 670 and 960 may occur in a particular notarization session. Participants of the notarization session are then notified that the notarization is now complete at step 970.

Figure 10:
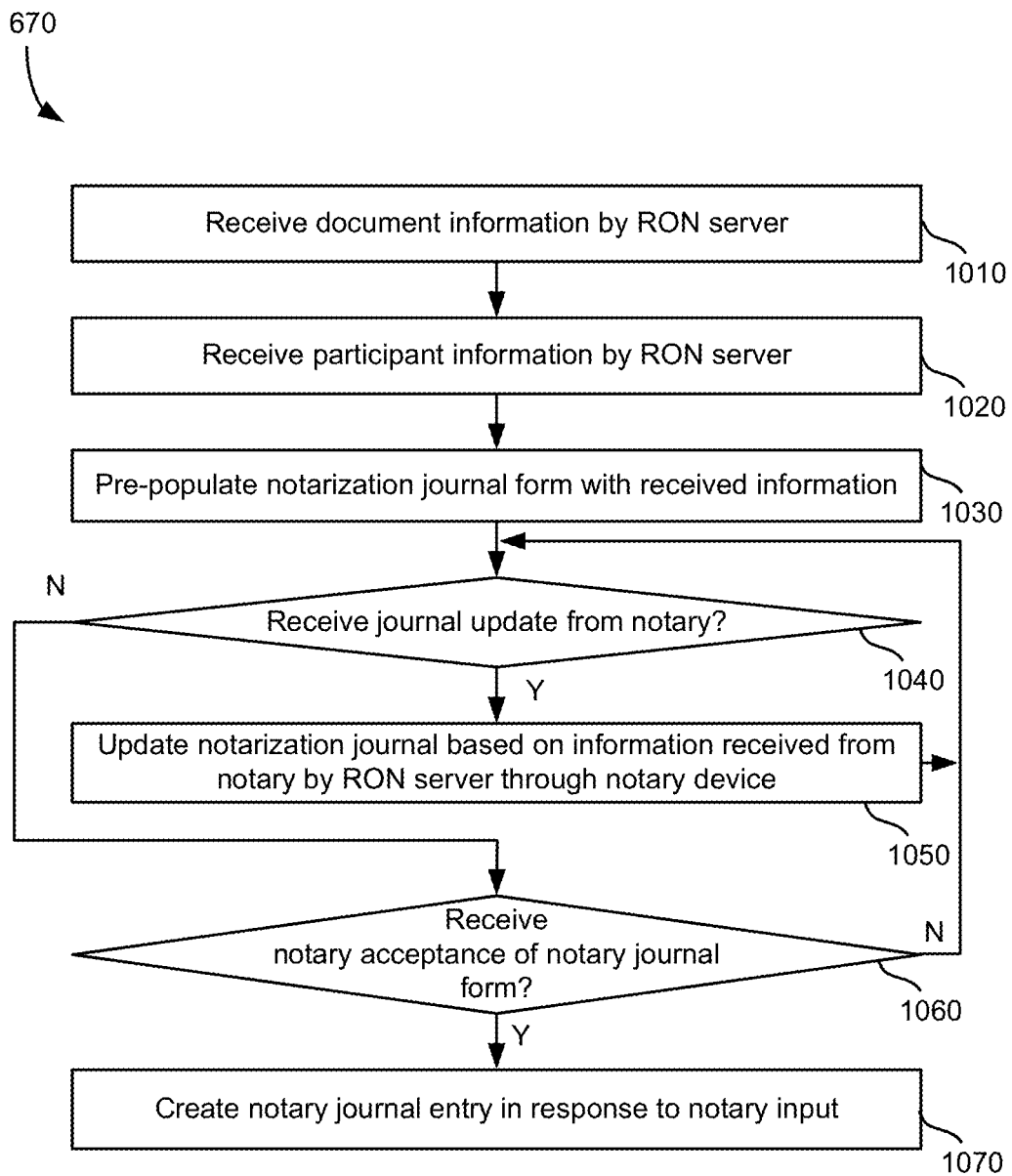
FIG. 10 is a method for creating a notary journal by a RON application.

FIG. 10 is a method for creating a notary journal by a RON application. The method of FIG. 10 provides more detail for step 670 of the method of FIGS. 6A-B. Document information is received by a RON server at step 1010. Participant information for a RON session is received by RON server at step 1020. A notarization journal form is pre-populated with the received document and participant information at step 1030. An example of an interface with pre-populated data is illustrated in FIG. 25. If journal updates are received from a notary at step 1040, the notarization journal form is updated based on information received from the notary by the RON server through the notary device at step 1050, and the process of FIG. 10 returns to step 1040. If notary acceptance is received of the notary journal form at step 1060, the notary journal entry is created in response to the notary input at step 1070.

Figure 11:
FIG. 11 is an interface provided by a RON application for performing a device camera check.

FIG. 11 is an interface provided by a RON application for performing a camera system quality check. The interface 1100 of FIG. 11 shows an image of the user associated with a particular device, a selection of a camera integrated with the device, and is provided to the user while the RON application determines if the camera provides an acceptable video quality. In some instances, acceptable video quality includes a minimum resolution and us visually satisfactory image of the user.

Figure 12:
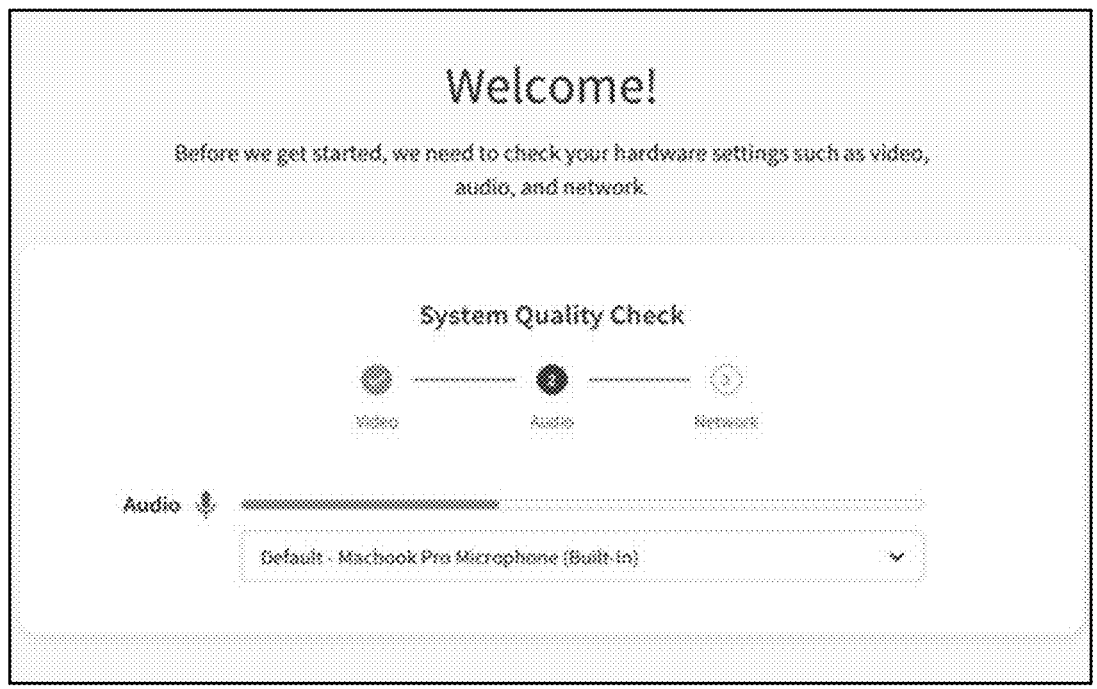
FIG. 12 is an interface provided by a RON application for performing a device audio check.

FIG. 12 is an interface provided by a RON application for performing an audio system quality check. The interface 1200 of FIG. 12 allows a user to select a microphone and is displayed to a user while a RON application determines if the audio captured by the microphone is at an acceptable level. In some instances, an acceptable audio level includes an acceptable noise level and signal level captured by the device microphone.

Figure 13:
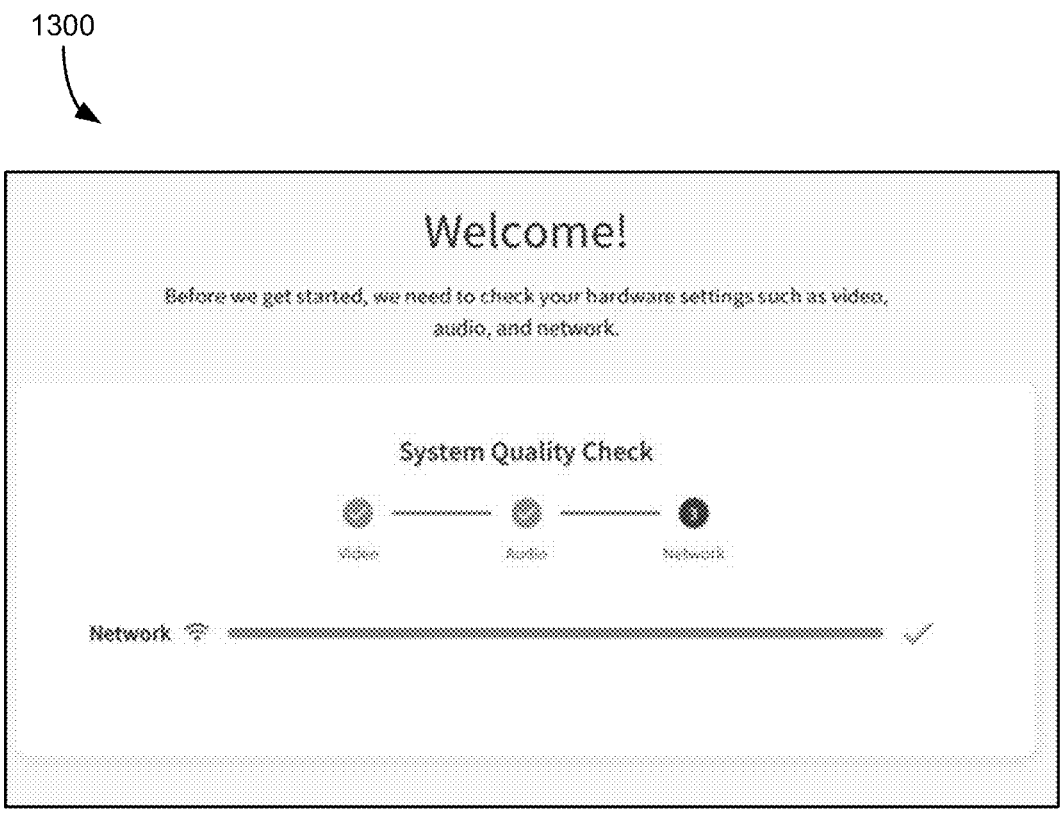
FIG. 13 is an interface provided by a RON application for performing a device network check.

FIG. 13 is an interface provided by a RON application for performing a network system quality check. Interface 1300 of FIG. 13 displays a status bar as a RON application analyzes the network strength and connection of the device used by the participant. In some instances, a score generated by a MOS process.

FIG. 14 is an interface provided by a RON application for collecting participant information. Interface 1400 of FIG. 14 receives input from a participant with respect to the participants name, address, city and state, ZIP Code, and date of birth.

Figure 15:
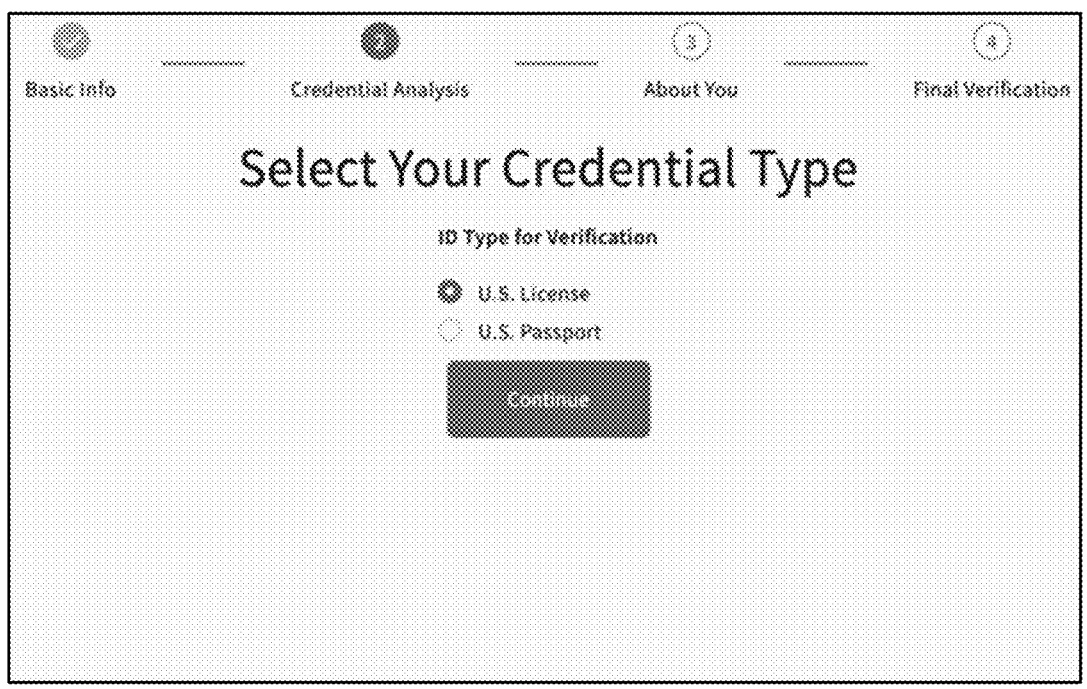
FIG. 15 is an interface provided by a RON application for initiating a participant credential check.

FIG. 15 is an interface provided by a RON application for initiating a participant credential check. Interface 1500 of FIG. 15 allows a user to select a credential type of a U.S. license or U.S. passport. After the selection, the user may provide captured images of the selected credential type to be analyzed in order to verify the user's identification.

FIG. 16 is an interface provided by a RON application for obtaining participant information for a KBA check. Interface 1600 of FIG. 16 provides a series of questions generated based on documents associated with a participant, such as for example a credit report for the participant. The participant must answer a certain number of questions, such as 70%, correct in order to pass a knowledge-based authentication process.

FIG. 17 is an interface provided by a RON application for confirming a user identity. Interface 1700 of FIG. 17 illustrates video of the user, an indication that the identity of the user has been confirmed, and a selectable icon the user can select to enter the conference room of the notarization session.

Figure 18:
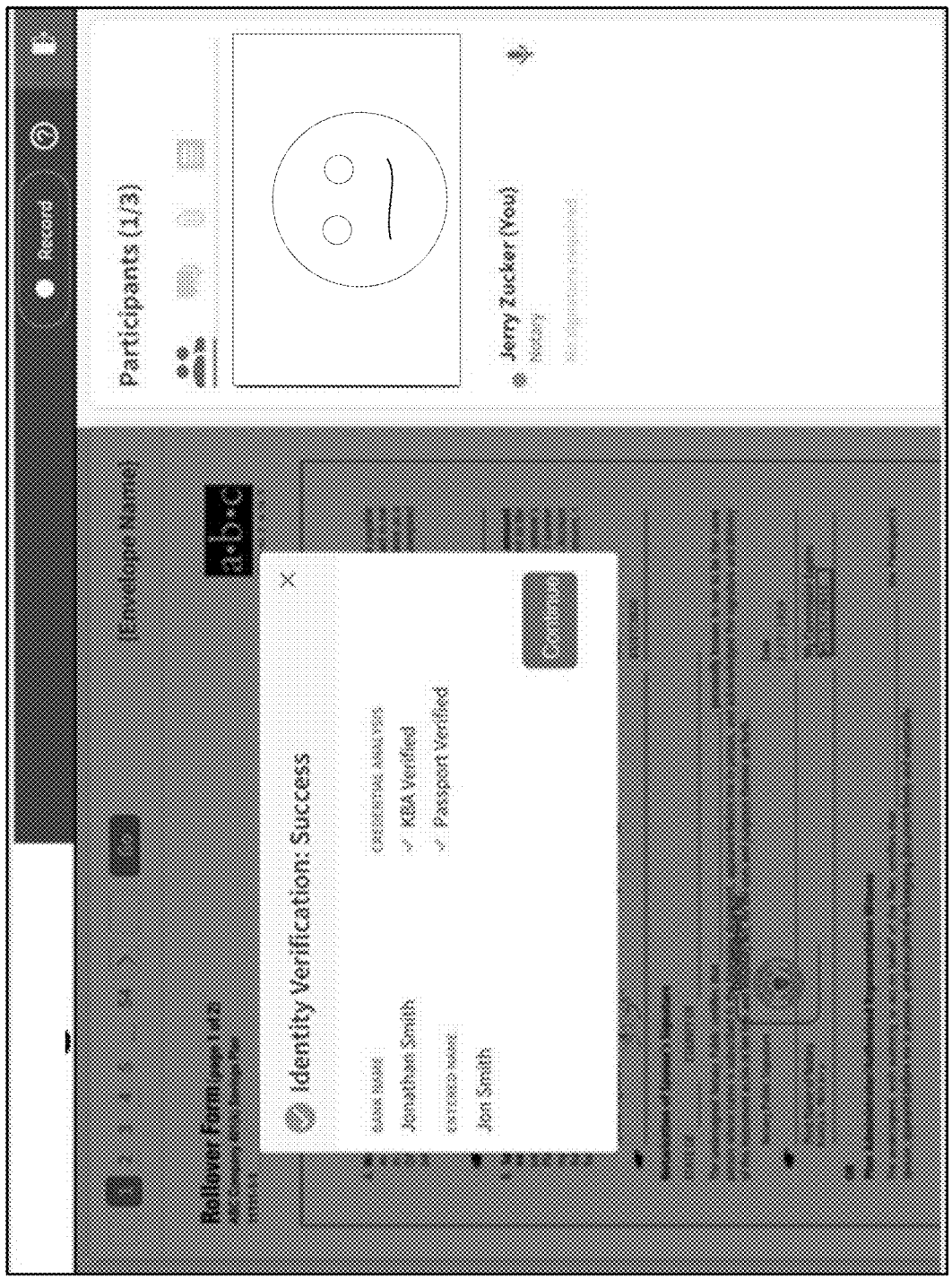
FIG. 18 is an interface provided by a RON application for admitting a verified participant into a notarization session.

FIG. 18 is an interface provided by a RON application for admitting a verified participant into a notarization session. Interface 1800 of FIG. 18 provides a content page of the conference room, which includes a document, a success full verification message to the participant, and a video and identifier for each participant currently in the RON session.

Figure 19:
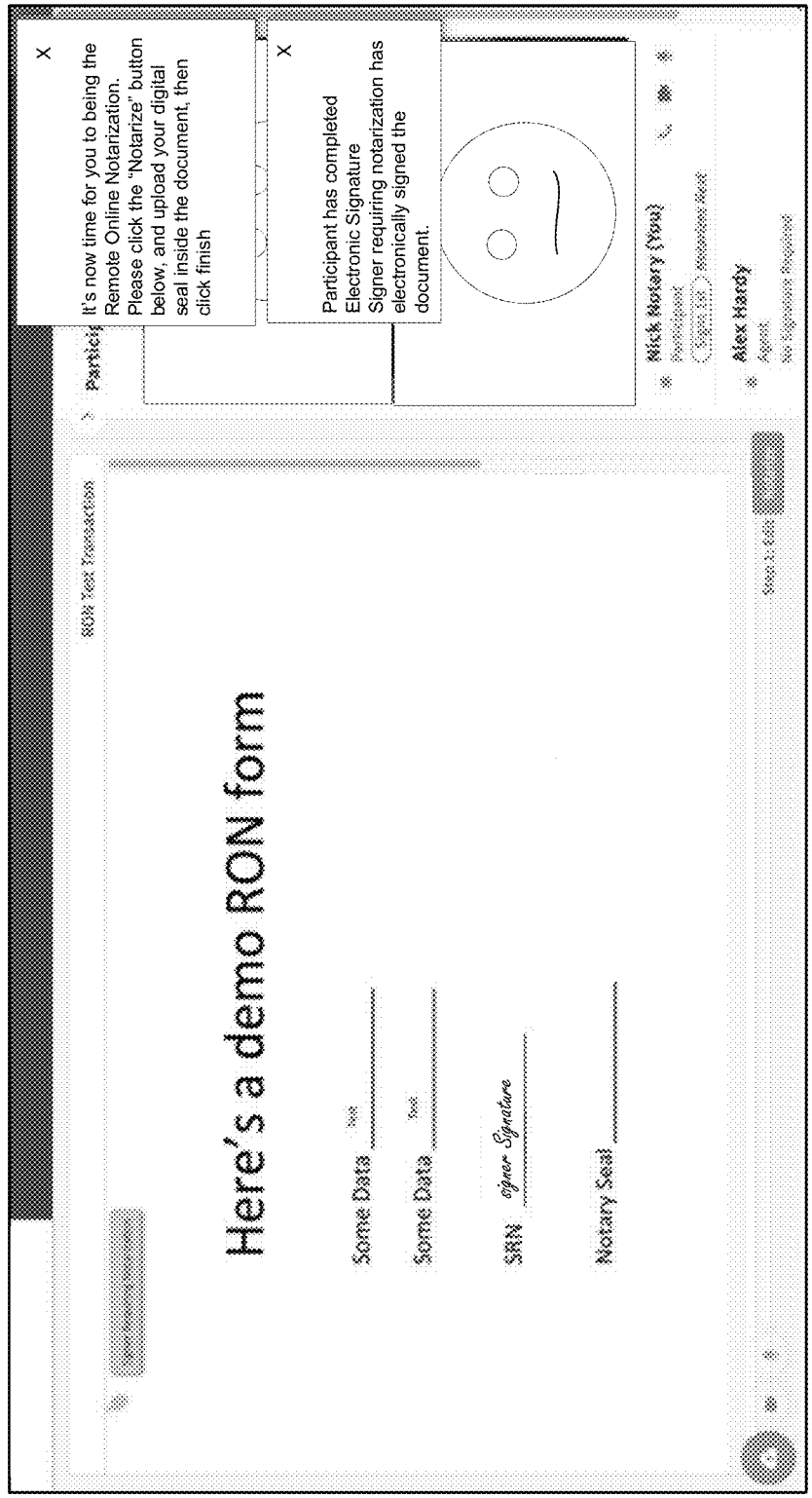
FIG. 19 is an interface provided by RON application for initiating a notarization process for a document.

FIG. 19 is an interface provided by RON application for initiating a notarization process for a document. Interface 1900 of FIG. 19 is a content page showing the completion of the electronic signature of a particular participant, and provides messages that electronic signatures are complete, and notarization shall now begin. The content page also includes a selectable icon prompting a notary to notarize the electronically signed document.

Figure 20:
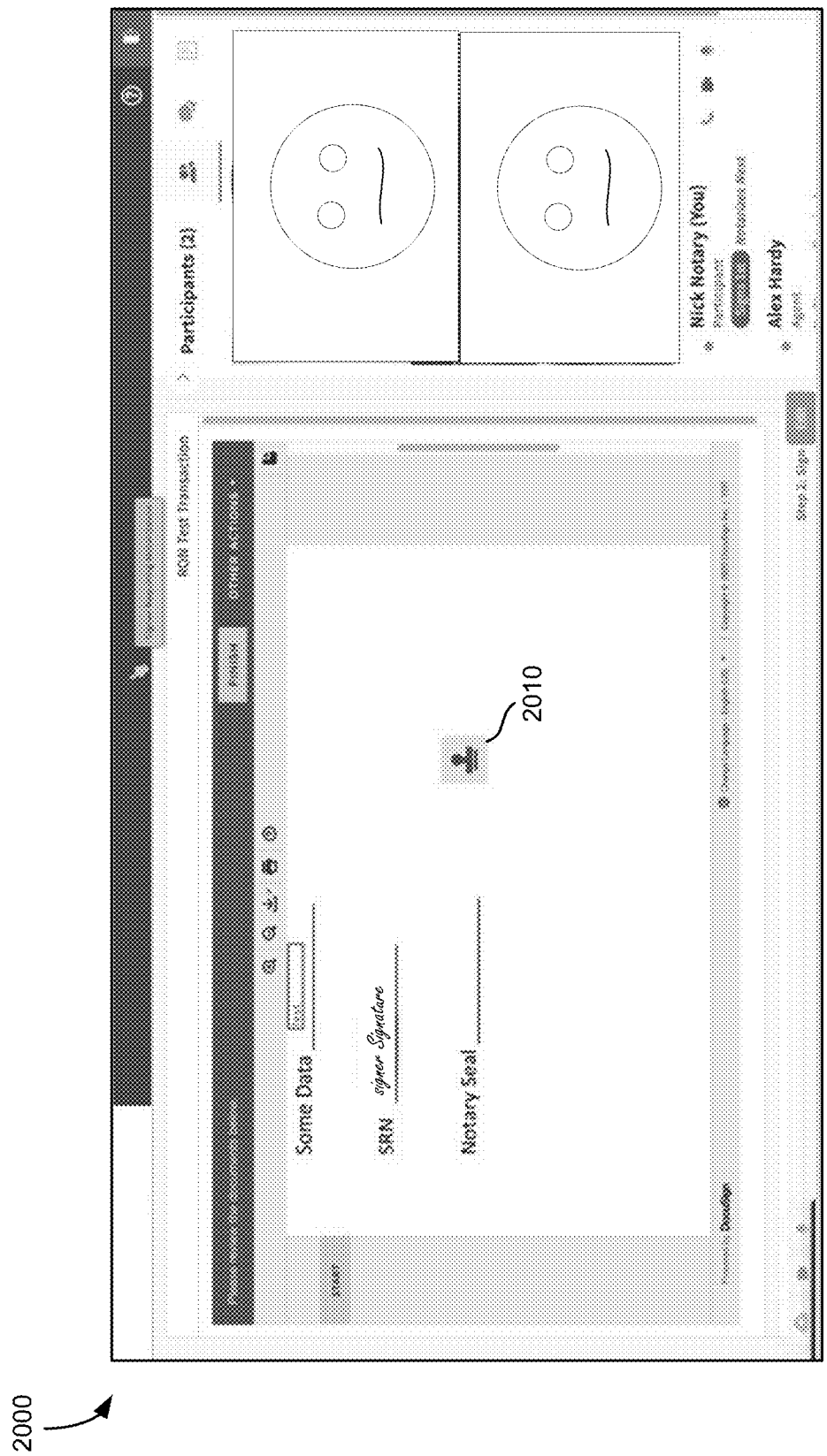
FIG. 20 is an interface provided by a RON application for initiating the affixation of a notary stamp to an e-signed digital document.

FIG. 20 is an interface provided by a RON application for initiating the affixation of a notary stamp to an e-signed digital document. Interface 2000 of FIG. 20 includes a view of the electronically signed document with a selectable icon 2010 for adding a notary stamp to the document. The interface also includes video images of the participants and identification information and status data for the participants.

Figure 21:
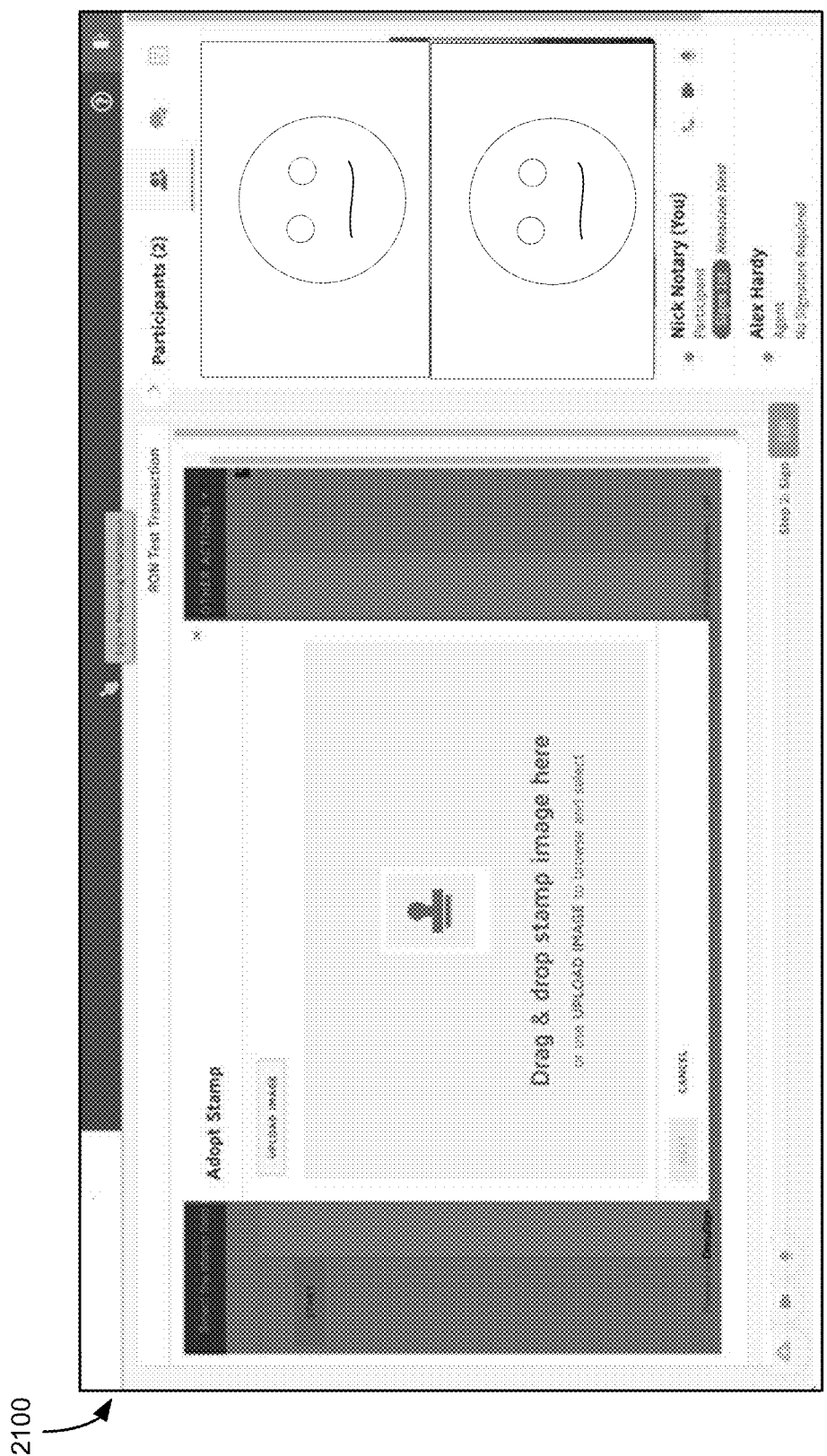
FIG. 21 is an interface provided by a RON application for loading a digital notary stamp to an e-signed digital document.

FIG. 21 is an interface provided by a RON application for loading a digital notary stamp to an e-signed digital document. Interface 2100 of FIG. 21 provides a window that prompts the user to drag-and-drop an image of a notary stamp (or notary seal). The notary stamp image provided by the user will be added to the document as the notarization stamp for the document.

Figure 22:
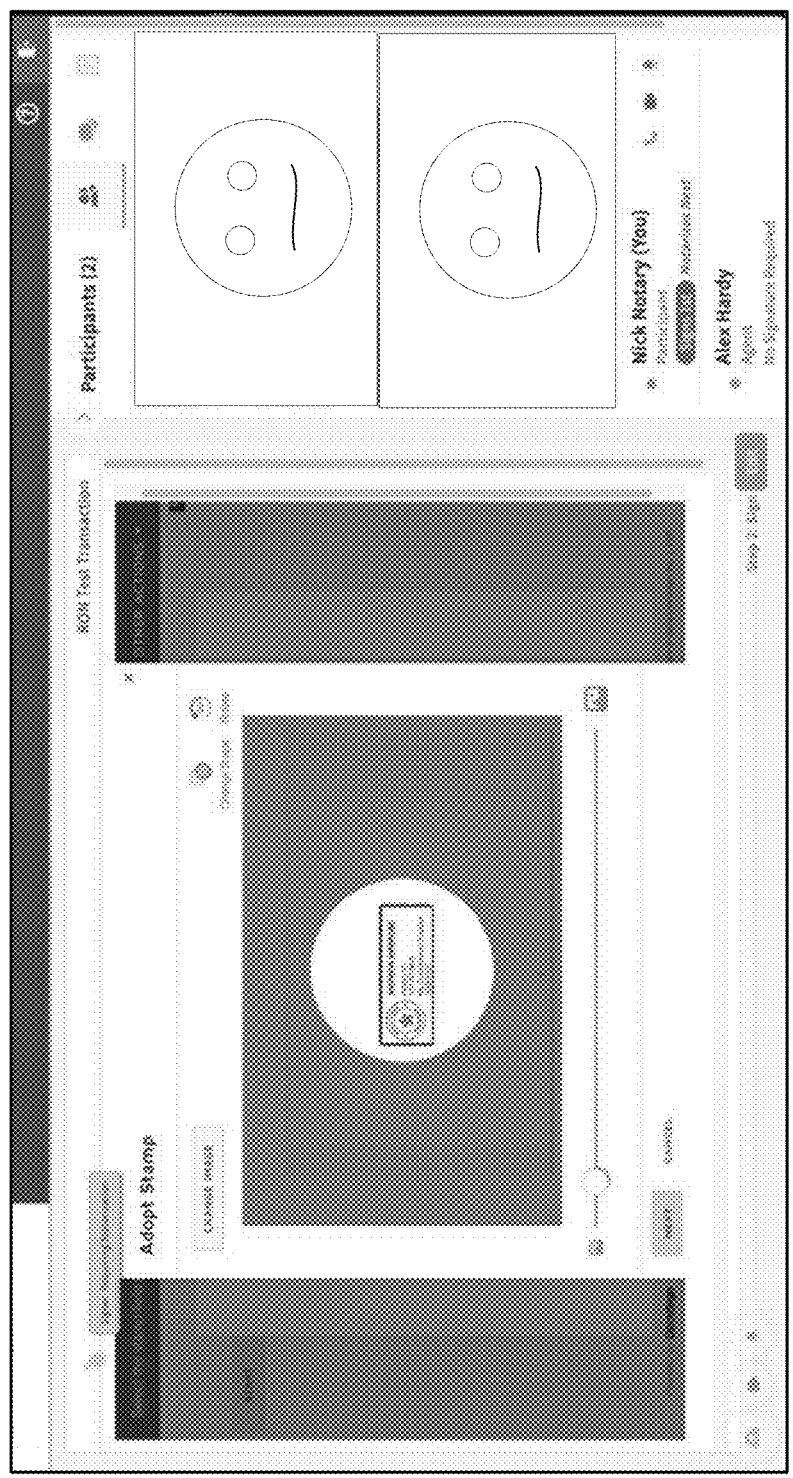
FIG. 22 is an interface provided by a RON application for adopting a digital notary stamp for an e-signed digital document.

FIG. 22 is an interface provided by a RON application for adopting a digital notary stamp for an e-signed digital document. Image 2200 of FIG. 22 illustrates the notary stamp associate with the notary and allows a user to manipulate the stamp, such as for example this increasing the size of the stamp, changing the shape of a graphic to be added to the document that includes the stamp, rotating the stamp, or changing the stamp image.

Figure 23:
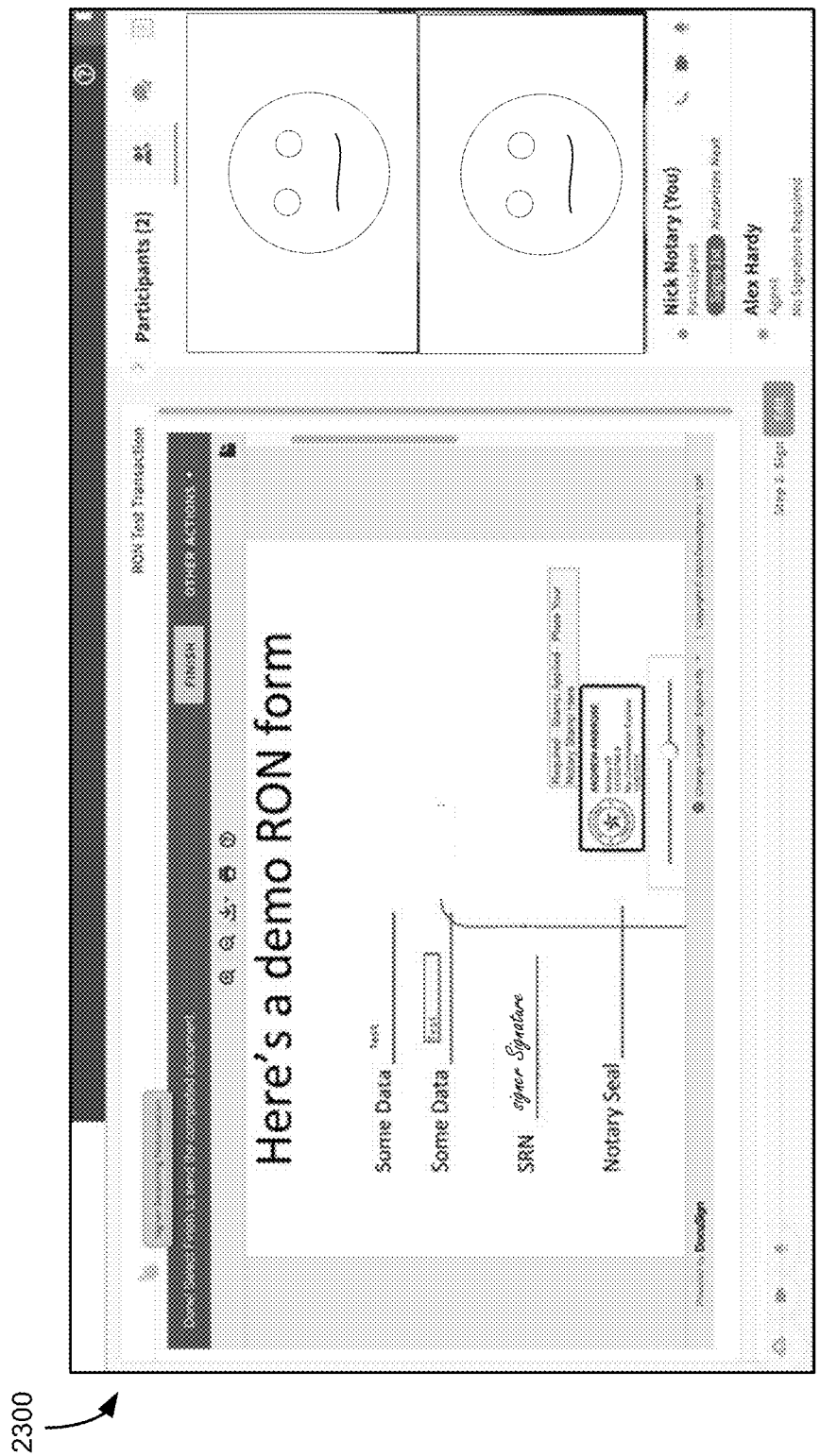
FIG. 23 is an interface provided by a RON application for finalizing a digital notarization to an e-signed digital document.

FIG. 23 is an interface provided by a RON application for finalizing a digital notarization to an e-signed digital document. Interface 2300 of FIG. 23 illustrates the electronically signed document with the notary stamp and provides the notary a chance to finalize the notarization of the digital document.

Figure 24:
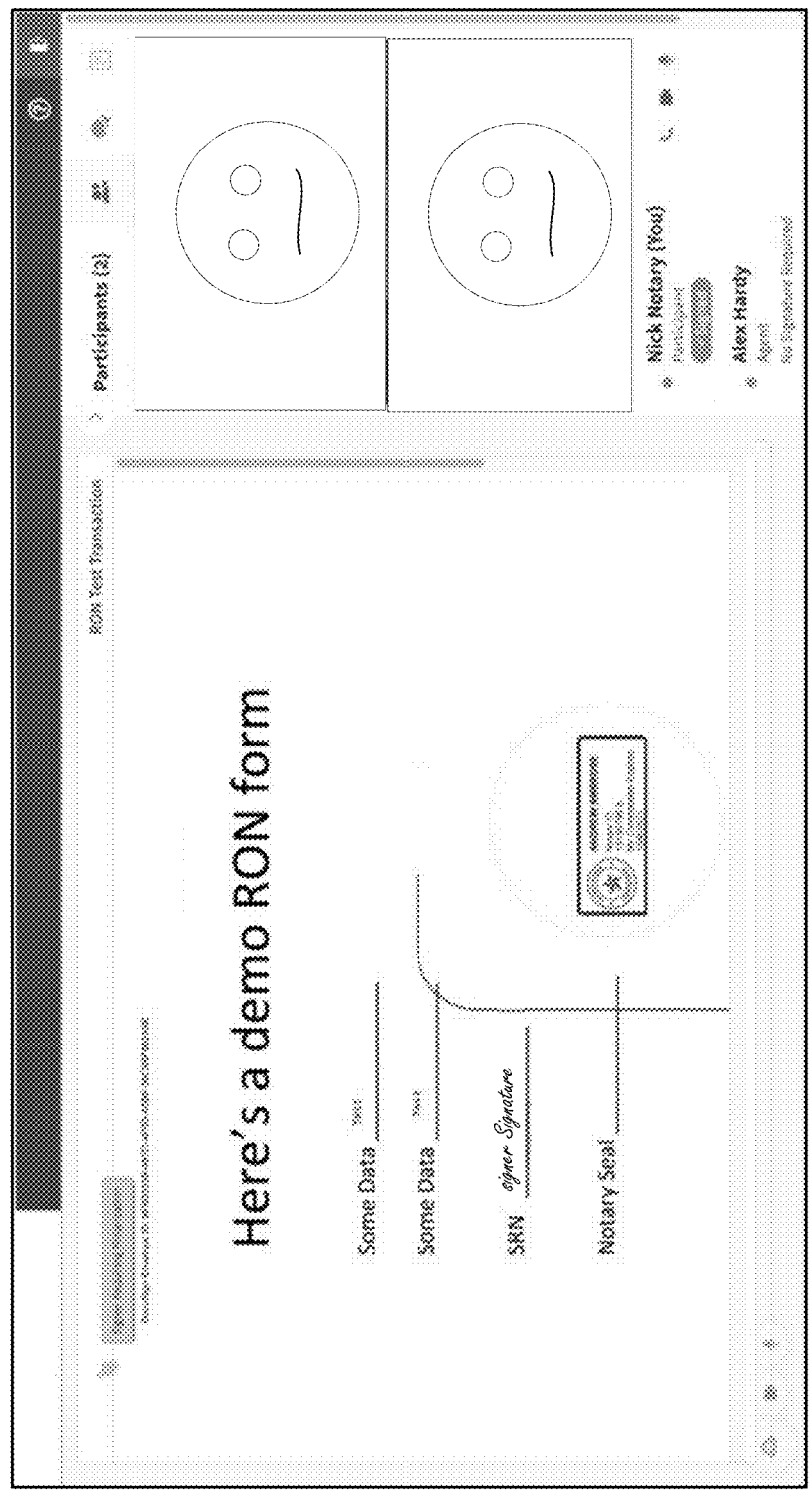
FIG. 24 is an interface provided by a RON application displaying a notarized e-signed digital document.

FIG. 24 is an interface provided by a RON application displaying a notarized e-signed digital document. Interface 2400 of FIG. 24 displays the final electronically signed and notarized document, which includes the notary stamp and electronic signatures of the signers.

FIG. 25 is an interface for creating a notary journal. The image of FIG. 25 illustrates a form that can be at least partially populated by the present system based on information gathered by the system during the technical check, credential analysis, and KBA analysis portion of the process, as well as based on account information associated with each participant (e.g., signer and notary). The displayed form includes notarization completion, document fee, document description, and type of notarial act data entry boxes. The displayed form also provides data entry boxes for participant contact identification and contact data, identity document data, and credential analysis data.

Figure 26:
FIG. 26 is a journal entry form generated by a RON application.

FIG. 26 is a journal entry form generated by a RON application. The notary journal entry from an interface 2600 of FIG. 26 includes the document title, notarization complete date, document description, whether any document fee was included, the number of pages, signatures, and initials in the document. The journal entry form also indicates the participants, including participant names, evidence of identity, and credential analysis details. The journal entry form also indicates the time at which a video of the RON session was recorded.

Figure 27:
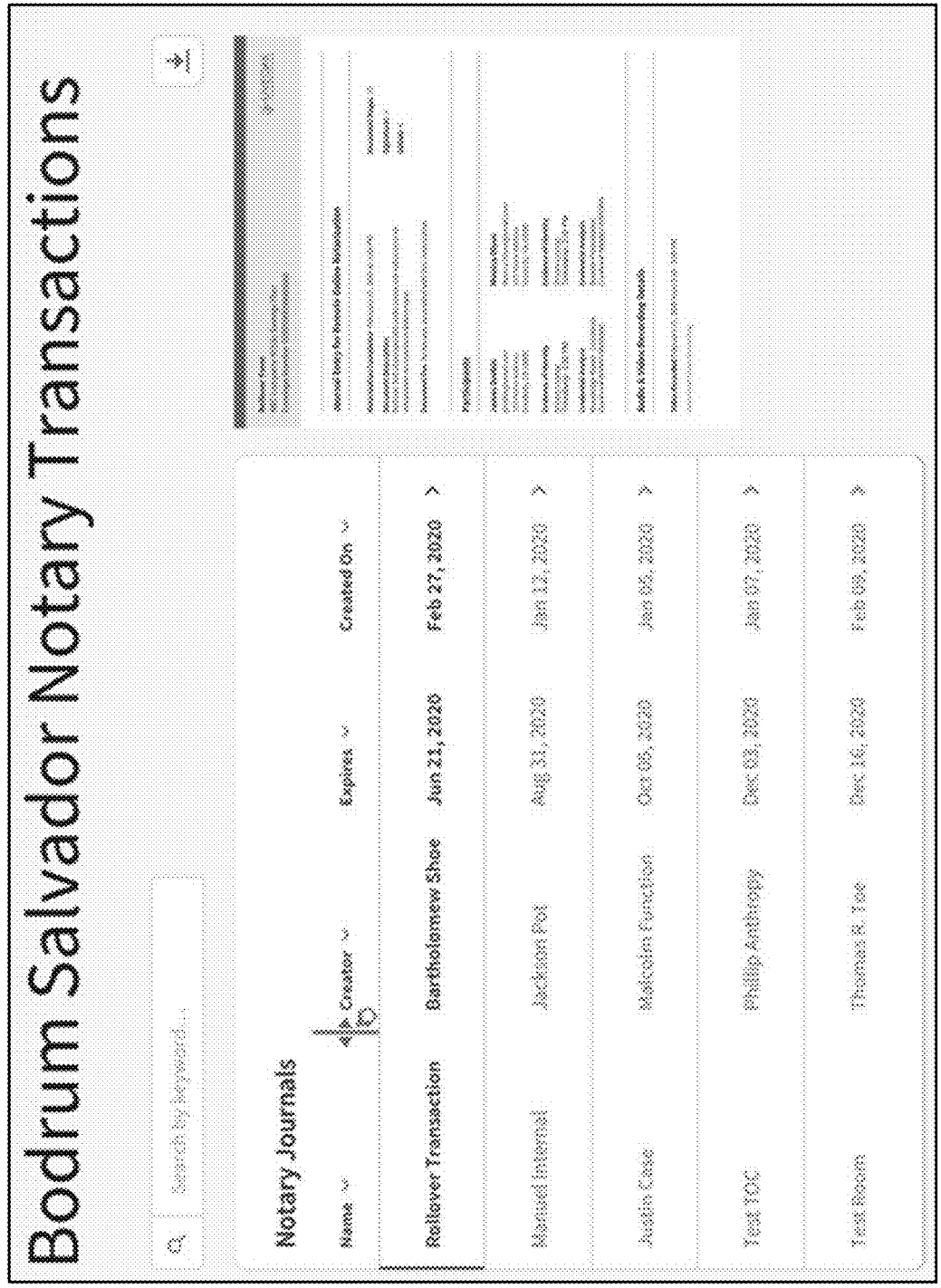
FIG. 27 is an interface provided by a RON application allowing notaries to search and access their notarizations.

FIG. 27 is an interface provided by a RON application allowing notaries to search and access their notarizations. Interface 2700 of FIG. 27 shows a content page which may be searched by a notary to display notarizations completed by the notary. Information for each and notarization includes the name of the document, document creator, the expiration date, and the date the notarization was created. For a selected notary journal entry, the journal entry document is also displayed.

Figure 28:
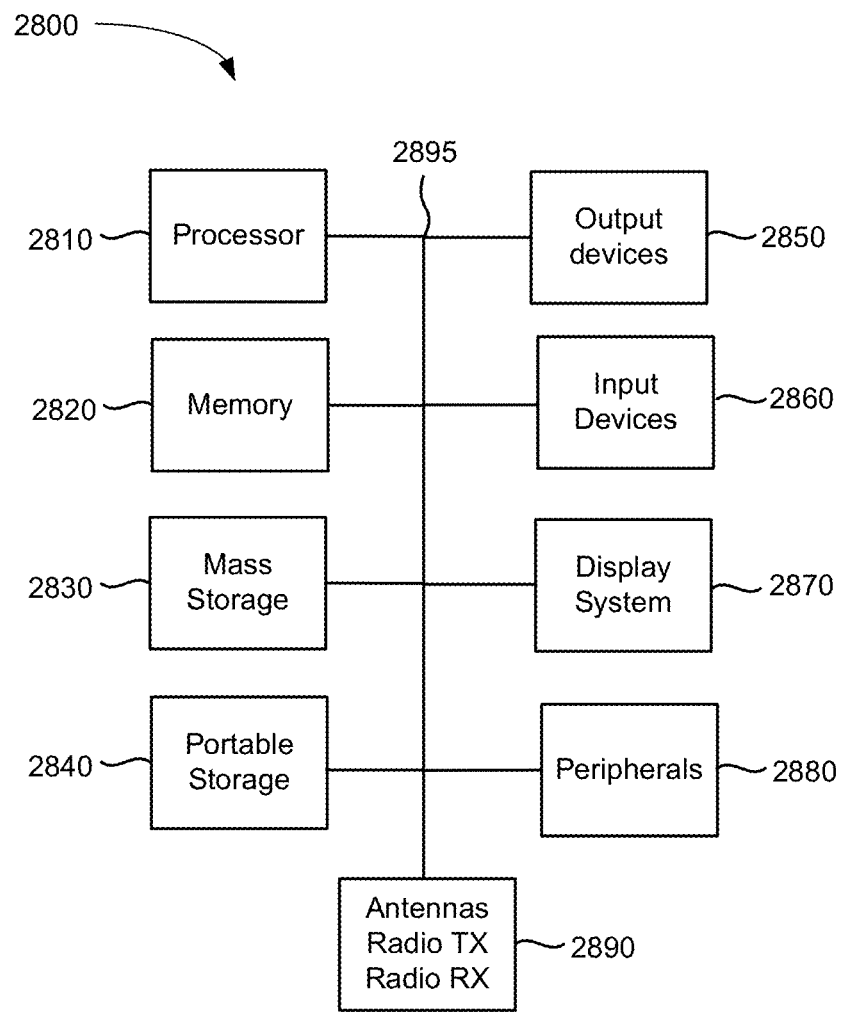
FIG. 28 is a block diagram of a system used to implement the present technology.

FIG. 28 is a block diagram of a system for implementing machines that implement the present technology. System 2800 of FIG. 28 may be implemented in the contexts of the likes of machines that implement computing devices 110-130, 150-160, server 170, datastore 180, services 210-220, service 310, service 410-420, and computing device 430. The computing system 2800 of FIG. 28 includes one or more processors 2810 and memory 2820. Main memory 2820 stores, in part, instructions and data for execution by processor 2810. Main memory 2820 can store the executable code when in operation. The system 2800 of FIG. 28 further includes a mass storage device 2830, portable storage medium drive(s) 2840, output devices 2850, user input devices 2860, a graphics display 2870, and peripheral devices 2880.

The components shown in FIG. 28 are depicted as being connected via a single bus 2890. However, the components may be connected through one or more data transport means. For example, processor unit 2810 and main memory 2820 may be connected via a local microprocessor bus, and the mass storage device 2830, peripheral device(s) 2880, portable storage device 2840, and display system 2870 may be connected via one or more input/output (I/O) buses.

Mass storage device 2830, which may be implemented with a magnetic disk drive, an optical disk drive, a flash drive, or other device, is a non-volatile storage device for storing data and instructions for use by processor unit 2810. Mass storage device 2830 can store the system software for implementing embodiments of the present invention for purposes of loading that software into main memory 2820.

Portable storage device 2840 operates in conjunction with a portable non-volatile storage medium, such as a floppy disk, compact disk or Digital video disc, USB drive, memory card or stick, or other portable or removable memory, to input and output data and code to and from the computer system 2800 of FIG. 28. The system software for implementing embodiments of the present invention may be stored on such a portable medium and input to the computer system 2800 via the portable storage device 2840.

Input devices 2860 provide a portion of a user interface. Input devices 2860 may include an alpha-numeric keypad, such as a keyboard, for inputting alpha-numeric and other information, a pointing device such as a mouse, a trackball, stylus, cursor direction keys, microphone, touchscreen, accelerometer, and other input devices. Additionally, the system 2800 as shown in FIG. 28 includes output devices 2850. Examples of suitable output devices include speakers, printers, network interfaces, and monitors.

Display system 2870 may include a liquid crystal display (LCD) or other suitable display device. Display system 2870 receives textual and graphical information and processes the information for output to the display device. Display system 2870 may also receive input as a touchscreen.

Peripherals 2880 may include any type of computer support device to add additional functionality to the computer system. For example, peripheral device(s) 2880 may include a modem or a router, printer, and other device.

The system of 2800 may also include, in some implementations, antennas, radio transmitters and radio receivers 2890. The antennas and radios may be implemented in devices such as smart phones, tablets, and other devices that may communicate wirelessly. The one or more antennas may operate at one or more radio frequencies suitable to send and receive data over cellular networks, Wi-Fi networks, commercial device networks such as a Bluetooth device, and other radio frequency networks. The devices may include one or more radio transmitters and receivers for processing signals sent and received using the antennas.

The components contained in the computer system 2800 of FIG. 28 are those typically found in computer systems that may be suitable for use with embodiments of the present invention and are intended to represent a broad category of such computer components that are well known in the art. Thus, the computer system 2800 of FIG. 28 can be a personal computer, handheld computing device, smart phone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Android, as well as languages including Java, .NET, C, C++, Node.JS, and other suitable languages.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen to best explain the principles of the technology and its practical application to thereby enable others skilled in the art to best utilize the technology in various embodiments and with various modifications as are suited to the particular use contemplated. It is intended that the scope of the technology be defined by the claims appended hereto.

The invention claimed is:

1. A method comprising:
    transmitting, by one or more processors, to a notary pool manager device, a request for a notary;
    receiving, by the one or more processors, from the notary pool manager device, an indication of a selection of a notary device for a notarization session;
    determining, by the one or more processors, that a technical capability of at least one of a signer device or the notary device satisfies a threshold;
    based on the determining, providing, by the one or more processors and to the signer device, access to the notarization session for performing a notarization of a document;
    based on receiving an indication of a first electronic signature and on receiving the indication of the selection of the notary device for the notarization session, outputting, by the one or more processors and to the notary device, an indication of a portion of the document being electronically signed with the first electronic signature;
    receiving, by the one or more processors and from the notary device, a second electronic signature and a digital notarization seal; and
    modifying, by the one or more processors, the document to include the first electronic signature, the second electronic signature, and the digital notarization seal.

2. The method of claim 1, wherein the technical capability includes one or more of a video capability of the signer device, an audio capability of the signer device, or a network capability of the signer device.

3. The method of claim 1, wherein the technical capability includes one or more of a video capability of the notary device, an audio capability of the notary device, or a network capability of the notary device.

4. The method of claim 1, wherein outputting the indication of the portion of the document being electronically signed with the first electronic signature comprises outputting, to the notary device, at least one image of the portion of the document captured when the first electronic signature is being executed.

5. The method of claim 1, further comprising:
    generating, by the one or more processors, a digital notary journal.

6. The method of claim 5, wherein the digital notary journal comprises a video generated by a camera of the signer device.

7. The method of claim 5, wherein the digital notary journal includes a list of notary session actions performed at the signer device and the notary device.

8. The method of claim 5, wherein the digital notary journal includes a log indicating at least one user interaction at one or more of the signer device or the notary device.

9. The method of claim 5 further comprising:
performing, by the one or more processors, a hash of data associated with the digital notary journal; and
storing, by the one or more processors, the hash of data associated with the digital notary journal.

10. The method of claim 1, further comprising:
causing, by the one or more processors, the signer device to perform a knowledge verification, wherein the providing is further in response to a determination that a user input satisfies the knowledge verification.

11. The method of claim 1, further comprising:
outputting, by the one or more processors and to the signer device, information as a content page configured for rendering by a browser on the signer device.

12. The method of claim 11, further comprising:
receiving, by the one or more processors, the first electronic signature using the content page.

13. Non-transitory computer-readable storage media storing executable instructions that, when executed by one or more processors, cause the one or more processors to:
transmit, to a notary pool manager device, a request for a notary;
receive, from the notary pool manager device, an indication of a selection of a notary device for a notarization session;
determine that a technical capability of at least one of a signer device or the notary device satisfies a threshold;
based on the determination, provide, to the signer device, access to the notarization session for performing a notarization of a document;
based on receiving an indication of a first electronic signature and on receiving the indication of the selection of the notary device for the notarization session, output, to the notary device, an indication of a portion of the document being electronically signed with the first electronic signature;
receive, from the notary device, a second electronic signature and a digital notarization seal; and
modify the document to include the first electronic signature, the second electronic signature, and the digital notarization seal.

14. A system comprising one or more processors and non-transitory computer-readable storage media storing instructions that, when executed by the one or more processors, cause the one or more processors to:
transmit, to a notary pool manager device, a request for a notary;
receive, from the notary pool manager device, an indication of a selection of a notary device for a notarization session;
determine that a technical capability of at least one of a signer device or the notary device satisfies a threshold;
based on the determination, provide, to the signer device, access to a notarization session for performing a notarization of a document;
based on receiving an indication of a first electronic signature and on receiving the indication of the selection of the notary device for the notarization session, output, to the notary device, an indication of a portion of the document being electronically signed with the first electronic signature;
receive, from the notary device, a second electronic signature and a digital notarization seal; and
modify the document to include the first electronic signature, the second electronic signature, and the digital notarization seal.

15. The system of claim 14, wherein the technical capability includes one or more of a video capability of the signer device, an audio capability of the signer device, or a network capability of the signer device.

16. The system of claim 14, wherein the technical capability includes one or more of a video capability of the notary device, an audio capability of the notary device, or a network capability of the notary device.

17. The system of claim 14, wherein to output the indication of the portion of the document being electronically signed with the first electronic signature, the instructions cause the one or more processors to output, to the notary device, at least one image of the portion of the document captured when the first electronic signature is being executed.

18. The system of claim 14, wherein the one or more processors are further configured to generate a digital notary journal.

19. The system of claim 18, wherein the digital notary journal comprises one or more of a video generated by a camera of the signer device, a list of notary session actions performed at the signer device and the notary device, or a log indicating at least one user interaction at one or more of the signer device or the notary device.

20. The system of claim 18, wherein the digital notary journal includes a list of notary session actions performed at the signer device and the notary device.

* * * * *